US009502939B2

(12) United States Patent
Kinpara et al.

(10) Patent No.: US 9,502,939 B2
(45) Date of Patent: Nov. 22, 2016

(54) METHOD FOR MANUFACTURING AN ARMATURE CORE

(75) Inventors: Yoshimasa Kinpara, Toyohashi (JP); Takahiro Yamamoto, Kosai (JP); Jirou Hayashi, Ama (JP); Asuka Tanaka, Kariya (JP)

(73) Assignees: ASMO CO., LTD., Shizuoka-ken (JP); DENSO CORPORATION, Aichi-ken (JP)

( * ) Notice: Subject to any disclaimer, the term of this patent is extended or adjusted under 35 U.S.C. 154(b) by 855 days.

(21) Appl. No.: 13/530,696

(22) Filed: Jun. 22, 2012

(65) Prior Publication Data

US 2012/0326554 A1 Dec. 27, 2012

(30) Foreign Application Priority Data

Jun. 27, 2011 (JP) ................................ 2011-142252

(51) Int. Cl.

| | |
|---|---|
| ***H02K 11/02*** | (2016.01) |
| ***H02K 3/34*** | (2006.01) |
| ***H02K 1/16*** | (2006.01) |
| ***H02K 15/02*** | (2006.01) |
| *H02K 15/12* | (2006.01) |

(52) U.S. Cl.
CPC ................ *H02K 3/345* (2013.01); *H02K 1/16* (2013.01); *H02K 15/024* (2013.01); *H02K 15/12* (2013.01); *H02K 2201/09* (2013.01); *Y10T 29/49009* (2015.01)

(58) Field of Classification Search
CPC ................ H02K 3/345; H02K 15/024; Y10T 29/49009
USPC .................... 29/596–598; 310/259, 179–180
See application file for complete search history.

(56) References Cited

U.S. PATENT DOCUMENTS

| | | | | |
|---|---|---|---|---|
| 4,876,473 | A * | 10/1989 | Tanaka et al. | 310/216.018 |
| 6,346,758 | B1 | 2/2002 | Nakamura | |
| 6,459,186 | B1 * | 10/2002 | Umeda et al. | 310/208 |
| 6,979,930 | B2 * | 12/2005 | Harada et al. | 310/216.004 |
| 7,042,129 | B2 * | 5/2006 | Neet | 310/208 |
| 7,194,794 | B2 * | 3/2007 | Arendes et al. | 29/596 |
| 2002/0130582 | A1 | 9/2002 | Oketani et al. | |
| 2003/0020357 | A1 | 1/2003 | Harada et al. | |
| 2006/0283004 | A1 * | 12/2006 | Ooiwa | 29/596 |
| 2009/0115281 | A1 | 5/2009 | Kimura et al. | |
| 2010/0187938 | A1 * | 7/2010 | Yamamoto et al. | 310/195 |
| 2010/0308680 | A1 | 12/2010 | Yamada et al. | |

FOREIGN PATENT DOCUMENTS

| | | |
|---|---|---|
| CN | 88203551 U | 11/1988 |
| CN | 101189780 A | 5/2008 |

(Continued)

OTHER PUBLICATIONS

Chinese Office Action of CN 201210227565.4 dated Sep. 6, 2015 with its English Translation.

*Primary Examiner* — Minh Trinh
(74) *Attorney, Agent, or Firm* — Christensen Fonder P.A.

(57) ABSTRACT

A method for manufacturing a stator configured to ensure insulation properties between a conductor and an armature core while preventing a manufacturing cost from increasing and preventing a space factor from lowering. In an edge-removing step, a plurality of independent edge-removing punches, which correspond to one slot S or two or more slots S, press and chamfer a corner portion of an axial opening edge of the slot in an axial end core sheet of the armature core.

9 Claims, 11 Drawing Sheets

(56) References Cited

FOREIGN PATENT DOCUMENTS

| | | | |
|---|---|---|---|
| CN | 201380232 | Y | 1/2010 |
| CN | 201750298 | U | 2/2011 |
| JP | 2001-28849 | A | 1/2001 |
| JP | 2002-272046 | A | 9/2002 |
| JP | 2003-37951 | A | 2/2003 |
| JP | 2003-61273 | A | 2/2003 |
| JP | 2005-130571 | A | 5/2005 |
| JP | 2009-38918 | | 2/2009 |
| JP | 2011-103759 | A | 5/2011 |

* cited by examiner

METHOD FOR MANUFACTURING AN ARMATURE CORE

TECHNICAL FIELD

The present invention relates to a method for manufacturing a stator, a stator manufactured by the manufacturing method, and a motor having the stator.

BACKGROUND ART

A stator described in Japanese Laid-Open Patent Publication No. 2009-38918 includes an armature core formed by laminating a plurality of core sheets on one another. A plurality of teeth extending in a radial direction of the armature core, and a plurality of slots are formed in the armature core. Sheet-like insulating members are inserted into the slots, and conductors are inserted into the insulating members. The insulating members located between the armature core and the conductors ensure insulation properties between the armature core and the conductors. It is known that if the stator is provided with SC coils, i.e., segment conductor coils, the space factor of the coils is increased.

In the stator described in Patent Document 1, ends of each tooth in an axial direction thereof are provided with soft portions. According to this configuration, when the conductor inserted into the slot is bent in the circumferential direction, it is possible to prevent the insulating member located between the armature core and the conductor from being damaged by a corner portion of an axial opening of the slot.

However, if the ends of the teeth in the axial direction are provided with such soft portions, additional soft portions must be provided separately from existing parts that configure the stator, such as the armature core, the conductors, and the insulating members. This increases the manufacturing costs. Further, to more effectively prevent the insulating member from being damaged by the soft portions, it is desirable that the soft portions be made to project inward of the slots to prevent the insulating members from coming into contact with the corner portions. In this case, however, the space factor of the coils is lowered.

The present invention has been accomplished in view of such circumstances, and it is an objective of the invention to provide a method for manufacturing a stator, a stator and a motor configured to ensure insulation properties with respect to conductors, and an armature core, while preventing the manufacturing costs from increasing and preventing the space factor from lowering.

Means for Solving the Problems

To achieve the foregoing objective and in accordance with one aspect of the present invention, a method for manufacturing a stator is provided. The stator includes an armature core, a plurality of conductors, and sheet-like insulating members. The armature core is formed by laminating a plurality of plate-like core sheets in an axial direction of the armature core. Each of the core sheets includes an annular yoke forming portion and a plurality of tooth forming portions which inwardly extend in a radial direction of the armature core from the yoke forming portion. The armature core includes an annular portion having the laminated yoke forming portions, a plurality of teeth including the laminated tooth forming portions and inwardly extending in the radial direction from the annular portion, and a plurality of slots each formed between a circumferentially adjacent pair of the teeth. The conductor constitute a coil, are inserted into the slots and are bent in the circumferential direction at positions near axial openings of the slots. The sheet-like insulating members respectively cover inner peripheral surfaces of the slots and are located between the armature core and the conductors. The method includes a pressing step for removing the edge of a corner portion of an axial opening edge of the slot in the core sheets that is located at least at an axial end of the armature core. The corner portion is pressed and chamfered by a plurality of independent edge-removing punches, each of which correspond to one slot or two or more slots.

BRIEF DESCRIPTION OF THE DRAWINGS

FIG. 5(*b*) is an end view taken along a 5*b*-5*b* line in FIG. 5(*a*);

FIG. 7(*b*) is an enlarged partial cross-sectional view of the stator;

FIG. 10(*b*) is a schematic diagram of the pressing device when the armature core is subjected to press working;

FIG. 13(*b*) is an enlarged partial view of the pressing device when the armature core is subjected to press working;

MODES FOR CARRYING OUT THE INVENTION

One embodiment of the present invention will now be described with reference to the drawings.

Figure 1:
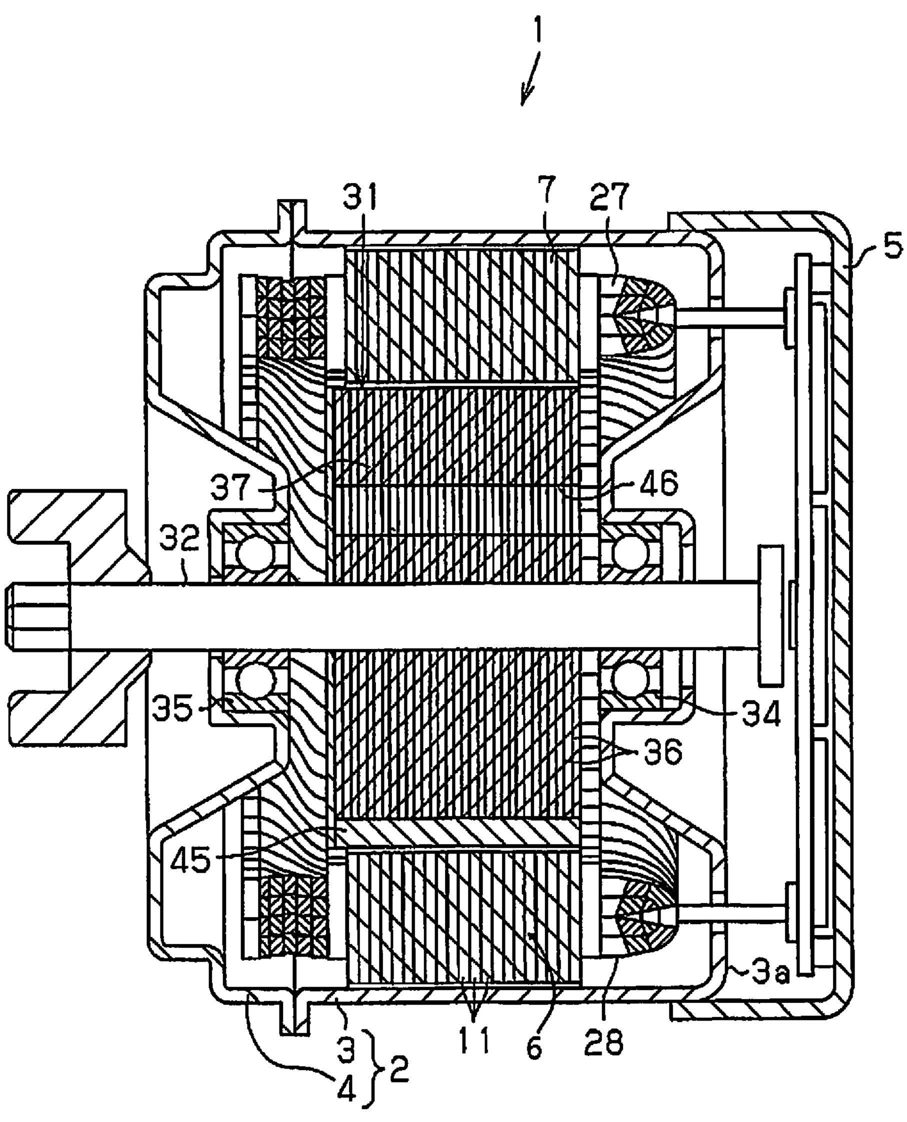
FIG. 1 is a cross-sectional view of a motor according to one embodiment of the present invention.

As shown in FIG. 1, a motor 1 includes a motor case 2. The motor case 2 includes a cylindrical housing 3, which is formed into a cylindrical shape with a closed end, and a front end plate 4, which closes an opening formed in a front side (left side in FIG. 1) of the cylindrical housing 3. A circuit accommodating box 5 is mounted on a rear end (right side in FIG. 1) of the cylindrical housing 3, and a power supply circuit such as a circuit substrate is accommodated in the circuit accommodating box 5.

A stator 6 is fixed to the inner peripheral surface of the cylindrical housing 3. The stator 6 includes an armature core 7. The armature core 7 is formed by laminating a plurality of core sheets 11 made of steel on one another in an axial direction of the armature core 7.

Figure 2:
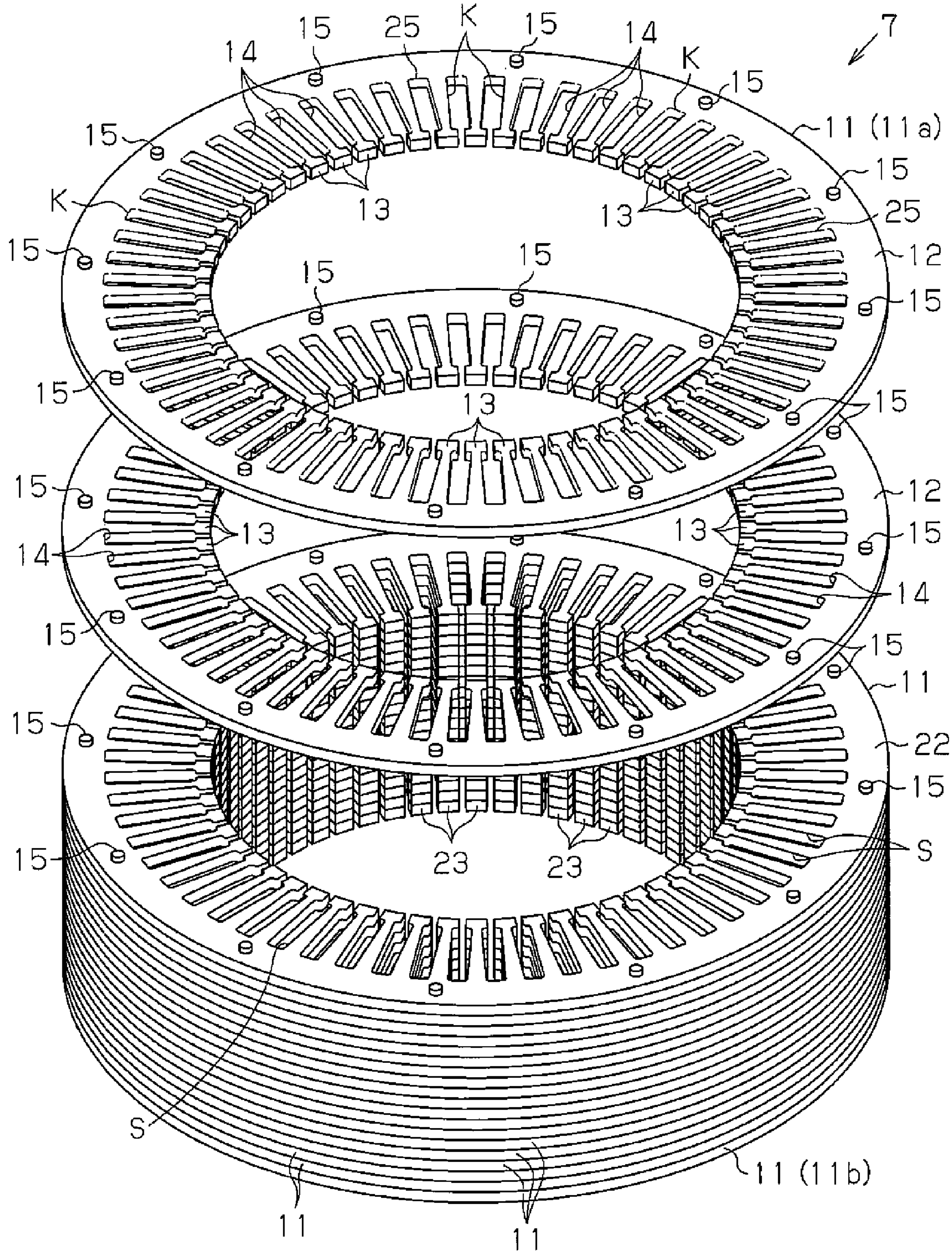
FIG. 2 is an exploded perspective view of an armature core in the embodiment.

As shown in FIG. 2, two core sheets 11 located on both axial ends of the core sheets 11, i.e., an upper end core sheet 11*a* and a lower end core sheet 11*b* are made of magnetic material that is softer than silicon steel sheet, such as SPCC (cold rolled steel sheet). The other core sheets 11 excluding the core sheets 11*a* and 11*b* are made of silicon steel sheet. The core sheets 11 are formed by punching these metal sheet materials by press work.

Figure 3:
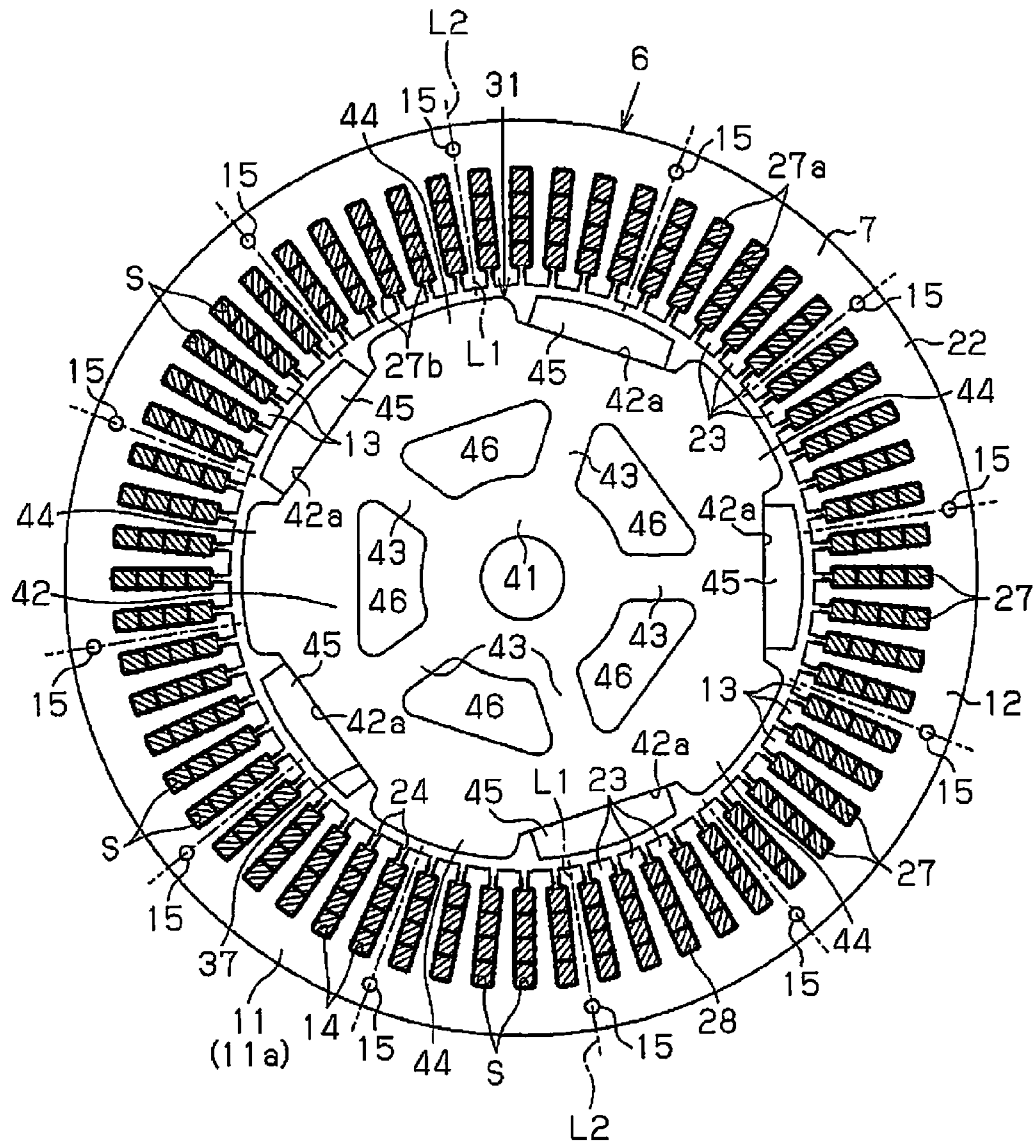
FIG. 3 is a partial cross-sectional view of a stator and a rotor in the embodiment.

As shown in FIGS. 2 and 3, the shape of each core sheet 11 as viewed in the axial direction is the same as the shape of the armature core 7 as viewed in the axial direction. Each of the core sheets 11 includes an annular plate-like yoke forming portion 12 and a plurality of (sixty in the present embodiment) comb-shaped plate-like tooth forming portions 13 extending inward in a radial direction of the armature core 7 from the yoke forming portion 12. The tooth forming portions 13 are formed at equal angular intervals (6° intervals in the present embodiment) in the circumferential direction of the armature core 7. Slot forming portions 14 are each formed between a circumferentially adjacent pair of the tooth forming portions 13.

Figure 4:
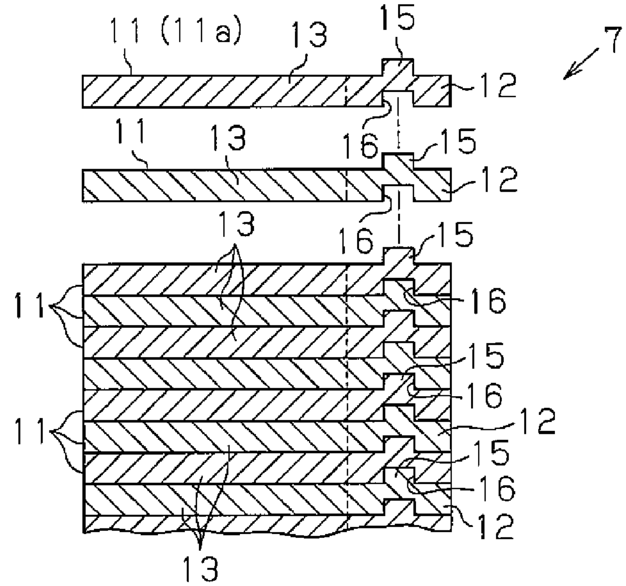
FIG. 4 is a cross-sectional view of the armature core.

As shown in FIGS. 2 to 4, a plurality of (twelve in the present embodiment) fitting projections 15 are formed on one side of the yoke forming portion 12 of each of the core sheets 11 in the thickness direction (axial direction) of the yoke forming portion 12, and fitting recesses 16, the number of which corresponds to the number of the fitting projections 15, are formed in the other side (lower side in FIG. 4) in the thickness direction of the yoke forming portion 12. In the present embodiment, the fitting projections 15 are formed on radial outer sides of the twelve tooth forming portions 13 arranged at 30° intervals in the circumferential direction to correspond to the tooth forming portions 13. Each of the fitting projections 15 is formed into a columnar shape projecting in the axial direction and is formed on an extension line L2 of a center line L1 of each of the tooth forming portions 13. The center line L1 is a line passing through a center of the tooth forming portion 13 in its width direction and extending in the radial direction. Centers of the 12 fitting projections 15 are located on the extension lines L2 of the center lines L1 of the 12 tooth forming portions 13, respectively. Each of the fitting projections 15 is located at a central portion of the yoke forming portion 12 in the radial direction.

As shown in FIG. 4, the fitting recesses 16 are formed in the yoke forming portion 12 of the core sheet 11 on the side opposite from the fitting projections 15 such that the fitting recesses 16 correspond to the fitting projections 15, respectively. Each of the fitting recesses 16 is recessed in the axial direction of the yoke forming portion 12, and the fitting recess 16 has a circle shape as viewed in the thickness direction of the yoke forming portion 12. The inner diameter of the fitting recess 16 is substantially equal to that of the fitting projection 15.

As shown in FIGS. 2 and 4, the core sheets 11 are laminated such that the yoke forming portions 12 are laminated in the thickness direction and the sixty tooth forming portions 13 are laminated in the thickness direction. Thus, the armature core 7 is constituted. The fitting projections 15 of one of a pair of axially adjacent core sheets 11 are fitted into the fitting recesses 16 of the other core sheet 11. According to this configuration, the laminated core sheets 11 are integrally fixed to one another in the axial direction.

As shown in FIGS. 2 and 3, the yoke forming portions 12 laminated in the axial direction form an annular portion 22. A plurality of (sixty in the present embodiment) teeth 23 extending inward in the radial direction of the annular portion 22 are formed by the tooth forming portions 13 laminated in the axial direction. Sixty slots S are formed such that each of them is located between a circumferentially adjacent pair of the teeth 23. The slots S are formed by connecting the slot forming portions 14 in the axial direction.

Figure 6:
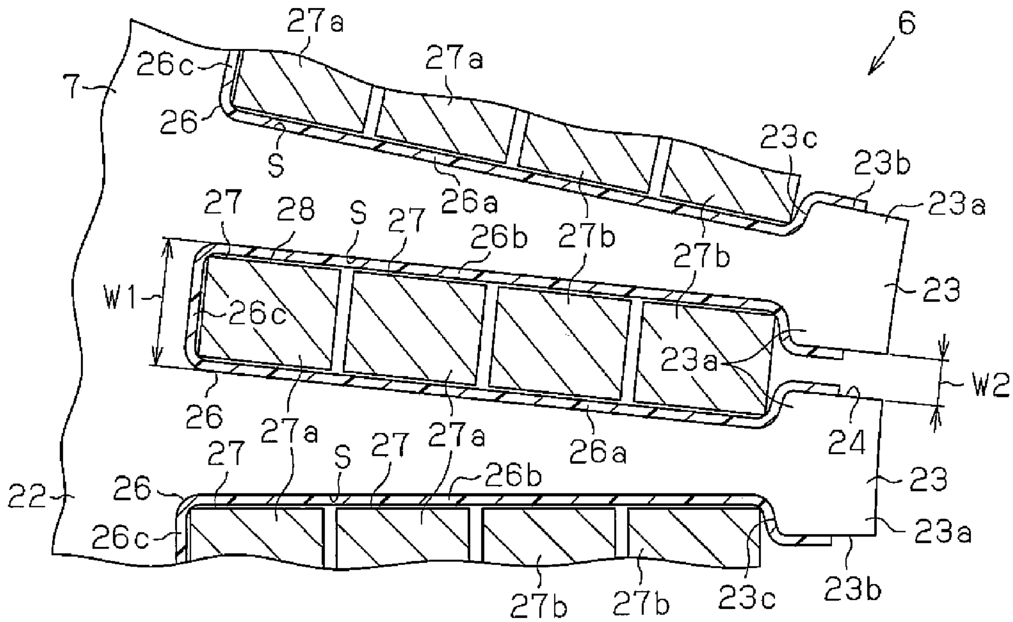
FIG. 6 is an enlarged partial cross-sectional view of the stator.

As shown in FIG. 6, a pair of rotor facing portions 23*a* projecting toward both sides in the circumferential direction is formed on the distal end of each of the teeth 23, i.e., on the radial inner end of each of the teeth 23. The distal end surface of each of the rotor facing portions 23*a*, i.e., the circumferential end surface of the rotor facing portion 23*a* is formed into a flat surface 23*b*. The flat surface 23*b* extends substantially in the radial direction and is parallel to the axial direction. The flat surfaces 23*b* in each circumferentially opposed pair are parallel to each other. The radial outer end surface of each of the rotor facing portions 23*a* is formed into an inclined surface 23*c*, which is inclined to separate away from the annular portion 22 from the proximal end to the distal end of the rotor facing portion 23*a*.

Each of the slots S extends through the armature core 7 in the axial direction. Radially inward of the slots S, slits 24 are formed such that each is located between a circumferentially opposed pair of the flat surfaces 23*b*. The circumferential width W2 of each slit 24 is narrower than the circumferential width W1 of each slot S. Each of the slits 24 opens at both ends in the radial direction. Each slit 24 opens in the slot on the outer side in the radial direction, and the slit 24 opens in an inner space of the armature core 7 on the inner side in the radial direction, i.e., opens in a space radially inward of an inner end surface of the tooth 23. The slit 24 also opens at both sides in the axial direction. Each of the slots S communicates with the inner space of the armature core 7 through the slit 24. In the present embodiment, each of the slots S is located in the space between adjacent teeth 23 and is located radially outward of the flat surface 23*b*. More specifically, each slot S is formed between a portion of a tooth 23 located radially outward of the rotor facing portion 23*a*, the inclined surface 23*c*, and the adjacent tooth 23 and is surrounded by the inner side surface of the annular portion 22, which is exposed radially inward.

Figure 5A:
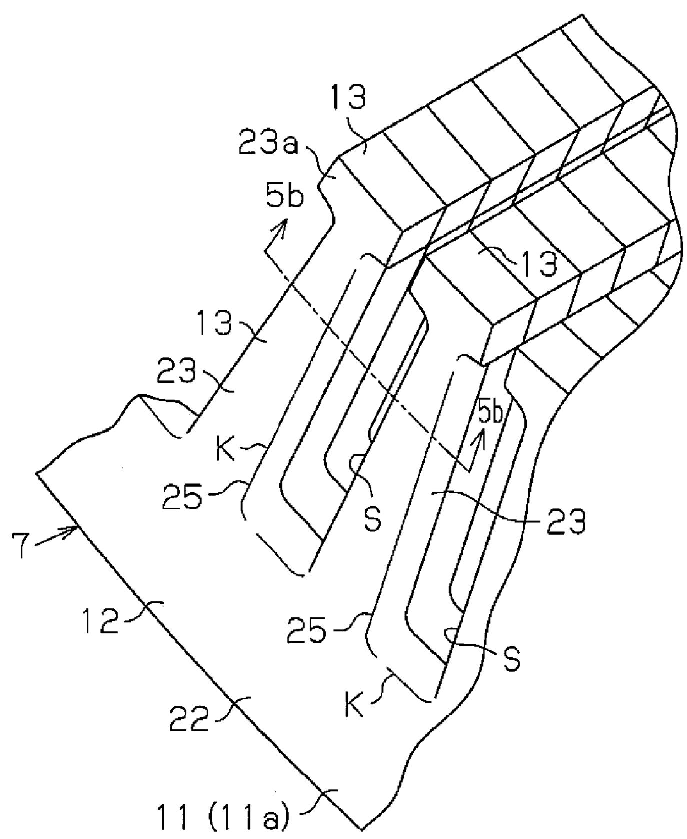
FIG. 5(*a*) is an enlarged partial perspective view of the armature core.
Figure 5B:
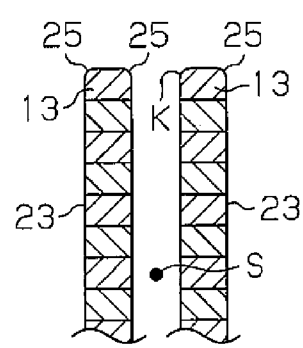

As shown in FIGS. 5(*a*) and 5(*b*), edge-removed portions 25 are formed on the core sheet 11*a* located at one axial end of the armature core 7. The edge-removed portions 25 are formed by pressing corner portions K of axial opening edges of the slots S in the core sheet 11*a* by press working. In the present embodiment, the edge-removed portions 25 are arcuate. Similar edge-removed portions 25 (not shown) are formed also on the core sheet 11*b* located at the other end of the armature core 7 in the axial direction.

Figure 7A:
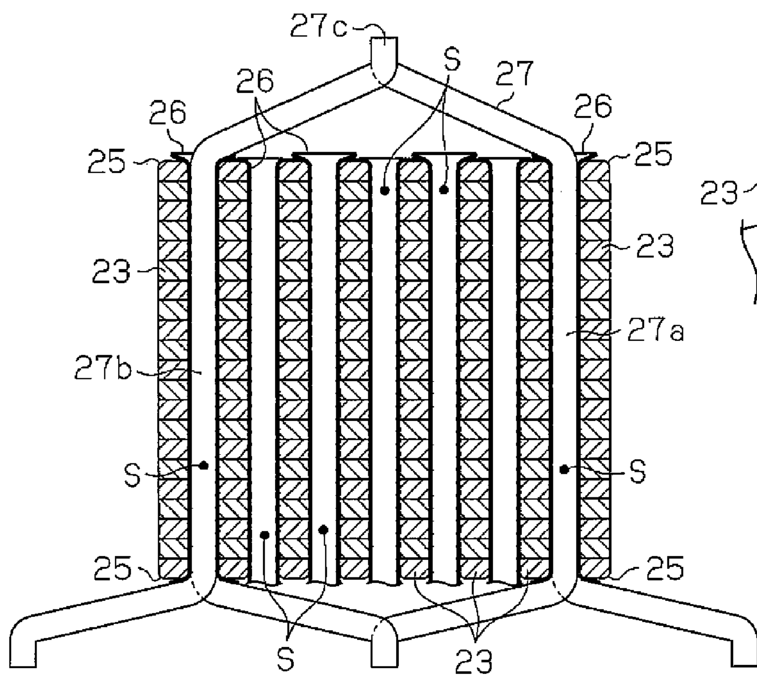
FIG. 7(*a*) is a partial cross-sectional view of the stator.
Figure 7B:
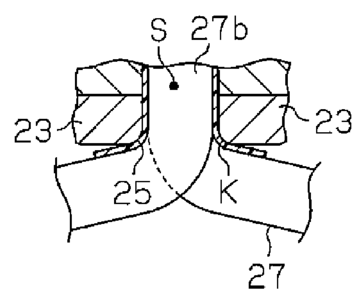

As shown in FIG. 6, a sheet-like insulating member 26 made of insulative plastic is inserted into each of the slots S. The thickness of the insulating member 26 of the present embodiment is smaller than half the circumferential width W2 of the slit 24. The insulating members 26 are inserted into the slots S from the axial direction in a state where both ends of each insulating member 26 are folded back such that the both ends are opposed to each other. Each insulating member 26 is shaped along the inner peripheral surface of the corresponding slot S to cover the inner peripheral surface of the slot S. The inner peripheral surface of each slot S refers to portions of both circumferential side surfaces of the teeth 23 that are located radially outward of the rotor facing portion 23*a*, the inclined surface 23*c*, and the inner side surface of the annular portion 22 that is exposed from between the adjacent teeth 23. More specifically, each insulating member 26 includes two opposed portions 26*a* and 26*b* and an edge connecting portion 26*c*. The opposed portions 26*a* and 26*b* respectively cover both side surfaces of the corresponding slot S in the circumferential direction. The edge connecting portion 26*c* connects radial outer ends of the two opposed portions 26*a* and 26*b* to each other and cover the radial outer surfaces of the slot S. The radially inner ends of the two opposed portions 26*a* and 26*b* are located in the slit 24. The two opposed portions 26*a* and 26*b* of each of the insulating members 26 are separated from each other in the circumferential direction. The radially inner ends of the two opposed portions 26*a* and 26*b* of each of the insulating members 26 cover the flat surface 23*b* in the slit 24. As shown in FIGS. 7(*a*) and 7(*b*), the insulating member 26 is formed longer than the axial length of the slot S, and the insulating member 26 projects outward of the slot S from both axial end openings of the slot S.

As shown in FIG. 3, three-phase (U phase, V phase and W phase) Y-connection segment coils 28 are wound and provided in the armature core 7, and the segment coils 28 are formed by electrically connecting a plurality of segment conductors 27 to each other. The segment conductors 27 are formed from wires having the same cross-sectional shapes. As shown in FIGS. 7(*a*) and 8, each of the segment conductors 27 includes two straight portions 27*a* and 27*b* and a connecting portion 27*c*, which connects the straight portions 27*a* and 27*b* to each other. Each segment conductor 27 is formed into a substantially U-shape. The two straight portions 27*a* and 27*b* penetrate the slots S having different circumferential positions and are located at different radial positions in the slots S.

Figure 8:
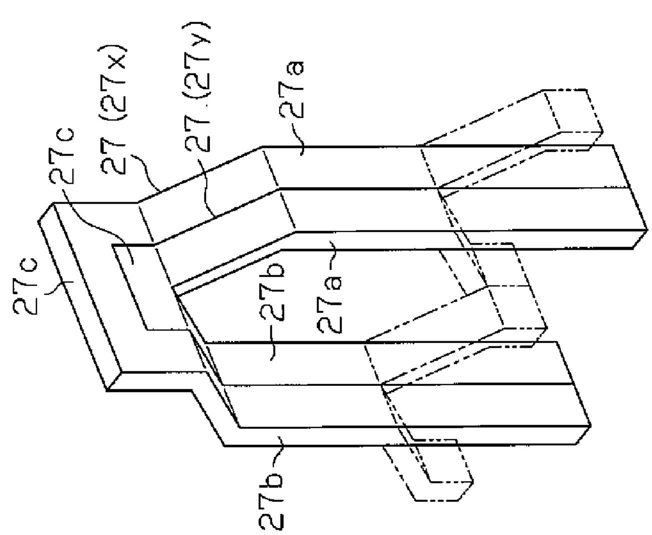
FIG. 8 is a schematic diagram of a segment conductor.

As shown in FIGS. 6 and 8, in the stator 6 of the present embodiment, total four straight portions 27*a* and 27*b* are arranged side by side in each slot S. Two kinds of segment conductors 27 are used. In one of the two kinds of segment conductors 27, the two straight portions 27*a* and 27*b* are located at first and fourth positions from the radial inner side (a segment conductor 27*x* illustrated on outer side in FIG. 8), and in the other kind of the segment conductors 27, the two straight portions 27*a* and 27*b* are located at second and third positions from the radial inner side (a segment conductor 27*y* illustrated on inner side in FIG. 8). The segment coil 28 is mainly formed from the two kinds of substantially U-shaped segment conductors 27. A special kind of segment conductor (e.g., segment conductor having only one straight portion) is used as a coil end such as a power supply connecting terminal and a neutral point connecting terminal.

As shown in FIGS. 7(*a*) and 8, the straight portions 27*a* and 27*b* are inserted into the insulating members 26 and penetrate the slots S, respectively. The distal ends of the straight portions 27*a* and 27*b* project outside from the slots S and are bent, and the distal ends are electrically connected to other distal ends or the special kind of segment conductors by welding or the like. According to this configuration, the segment coils 28 are formed by the segment conductors 27. The distal end portions of the straight portions 27*a* and 27*b* are pressed against the edge-removed portions 25 through the insulating members 26 and bent in the vicinity of the edge-removed portions 25. In FIG. 8, the bent distal end portions of the straight portions 27*a* and 27*b* are shown by phantom lines. Each of the segment conductors 27 is electrically insulated from the armature core 7 by the insulating member 26 located between each of the segment conductors 27 and the armature core 7.

As shown in FIG. 1, a rotor 31, which is opposed to the stator 6 in the radial direction, is located inside of the stator 6. A rotation shaft 32 is inserted into the rotor 31 to be fixed. In the present embodiment, the rotation shaft 32 is made of metal (preferably non-magnetic material) and is supported by a bearing 34 fixed to a bottom 3*a* of the cylindrical housing 3 and by a bearing 35 fixed to the front end plate 4.

The rotor 31 is a consequent-pole type rotor and includes an annular rotor core 37. The rotor core 37 is formed by laminating, on one another, a plurality of rotor core sheets 36 made of steel sheet, and the rotor core 37 is fitted over the rotation shaft 32.

Figure 9:
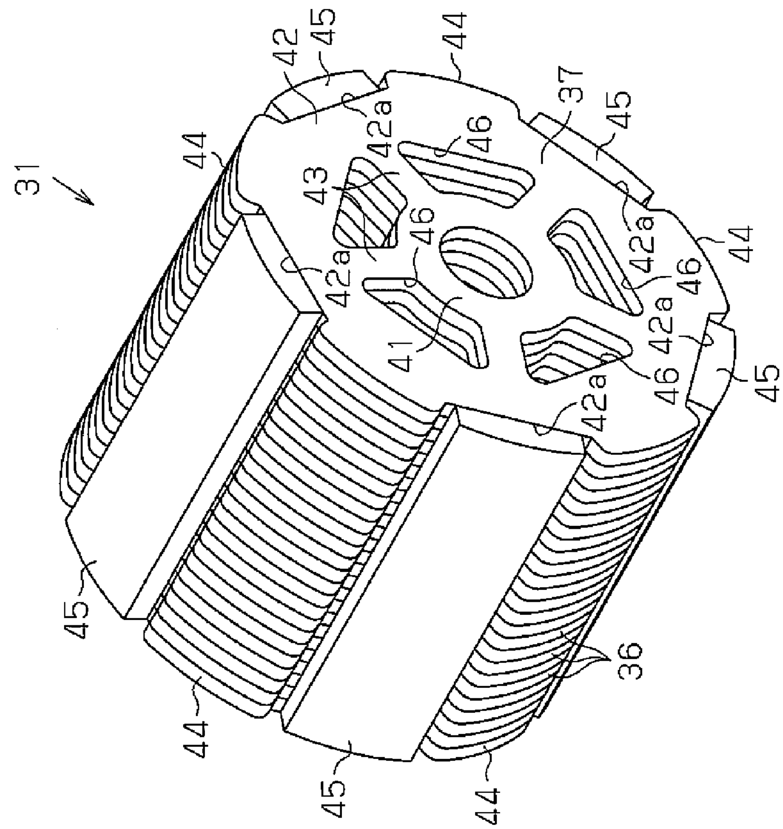
FIG. 9 is a perspective view of the rotor.

As shown in FIGS. 3 and 9, the rotor core 37 includes a cylindrical shaft fixing tubular portion 41, a magnet fixing tubular portion 42, and bridging portions 43. The shaft fixing tubular portion 41 is fitted over the rotation shaft 32, and the magnet fixing tubular portion 42 surrounds an outer side surface of the shaft fixing tubular portion 41 at a constant distance therefrom. The bridging portions 43 connect the shaft fixing tubular portion 41 and the magnet fixing tubular portion 42 to each other at a constant distance therefrom.

Five sectoral recesses 42*a* are provided in the outer peripheral surface of the magnet fixing tubular portion 42. These recesses 42*a* are arranged at equal distances from one another in the circumferential direction and extend through the entire outer peripheral surface of the magnet fixing tubular portion 42 in the axial direction. Five salient poles 44 are formed on the outer peripheral surface of the magnet fixing tubular portion 42 between the recesses 42*a*.

Magnets 45 are fixed to the recesses 42*a*, respectively. Each of the five magnets 45 is arranged such that the radial inner surface of each magnet 45 is a north pole and the radial outer surface of the magnet 45, i.e., a surface thereof on the side of the stator 6 is a south pole. As a result, a magnetic pole of an outer side surface of a salient pole 44, i.e., a surface of the salient pole 44 on the side of the stator 6 is a north pole unlike the outer side surface of the magnet 45.

The number Z of the teeth 23 in the stator 6 of the present embodiment is set in the following manner.

If the number of magnets 45 of the rotor 31 (number of pairs of magnetic poles) is defined as p (p is integer not less than 2) and the number of phases of the segment coils 28 is defined as m, the number Z of teeth 23 is obtained by the following expression:

$$Z=2\times p\times m\times n \text{(where, n is a natural number).}$$

In the present embodiment, the number Z of the teeth 23 (Z=2×5 (number of magnets 45)×3 (number of phases)×2) is sixty.

Five bridging portions 43, which connect the shaft fixing tubular portion 41 and the magnet fixing tubular portion 42 to each other and hold them, are provided on the rotor 31. Each of the bridging portions 43 extends from the outer peripheral surface of the shaft fixing tubular portion 41 and is connected to the inner peripheral surface of the magnet fixing tubular portion 42. The bridging portions 43 are connected to the inner peripheral surface of the magnet fixing tubular portion 42 at positions corresponding to the recesses 42*a* to which the magnets 45 are fixed. Each of the bridging portions 43 is provided such that a center position (angle) of its circumferential direction and a center position (angle) of the magnet 45 in the circumferential direction are located side by side in the radial direction (angles match with each other). A space formed between an outer side surface of the shaft fixing tubular portion 41 and an inner side surface of the magnet fixing tubular portion 42 are divided by the bridging portions 43 into five gaps 46 which axially extend between the shaft fixing tubular portion 41 and the magnet fixing tubular portion 42. By forming these gaps 46, the rotor core 37 becomes light in weight, and the motor 1 can be reduced in weight.

As shown in FIGS. 1 and 3, if a drive current is supplied from a power supply circuit in the circuit accommodating box 5 to the segment coils 28, a rotating magnetic field for rotating the rotor 31 by the stator 6 is generated, a magnetic flux is delivered between the teeth 23 and the rotor 31, and the rotor 31 is rotated.

Next, a method for manufacturing the stator 6 of the present embodiment will be described.

First, a laminating step for laminating the core sheets 11 on one another in the thickness direction to form the armature core 7 is carried out. As shown in FIG. 2, in the laminating step, the core sheets 11 are laminated on one another such that the yoke forming portions 12 of the core sheets 11 are laminated on one another in the thickness direction (axial direction) and the sixty tooth forming portions 13 are laminated on one another in the thickness direction. At that time, as shown in FIG. 4, 12 fitting recesses 16 of one of the two adjacent core sheets 11 and twelve fitting projections 15 of the other core sheet 11 are superposed on each other in the thickness direction (axial direction) of the core sheets 11. The laminated core sheets 11 are integrally fixed to one another in the axial direction. At that time, the fitting projections 15 of one of the two adjacent core sheets 11 are press-fitted into the fitting recesses 16 of the other core sheet 11. According to this press-fitting, the adjacent core sheets 11 are fixed to each other (integrally formed together). The armature core 7, including the annular portion 22, which is formed from the axially laminated yoke forming portions 12, and sixty teeth 23, which are formed from the axially laminated tooth forming portions 13, is formed from the core sheets 11. In the armature core 7, the two core sheets 11 located on both the axial ends, i.e., the core sheets 11*a* and 11*b* are made of magnetic material (e.g., SPCC (cold rolled steel sheet)) that is softer than silicon steel sheet, and the other core sheets 11 are made of silicon steel sheet.

Next, an edge-removing step for removing the edges the corner portions K of the axial opening edges of the slots S in each of the core sheets 11*a* and 11*b* is carried out. In the edge-removing step, the corner portions K are arcuately chamfered by subjecting the corner portions K to press working.

Figures 10A, 10B:
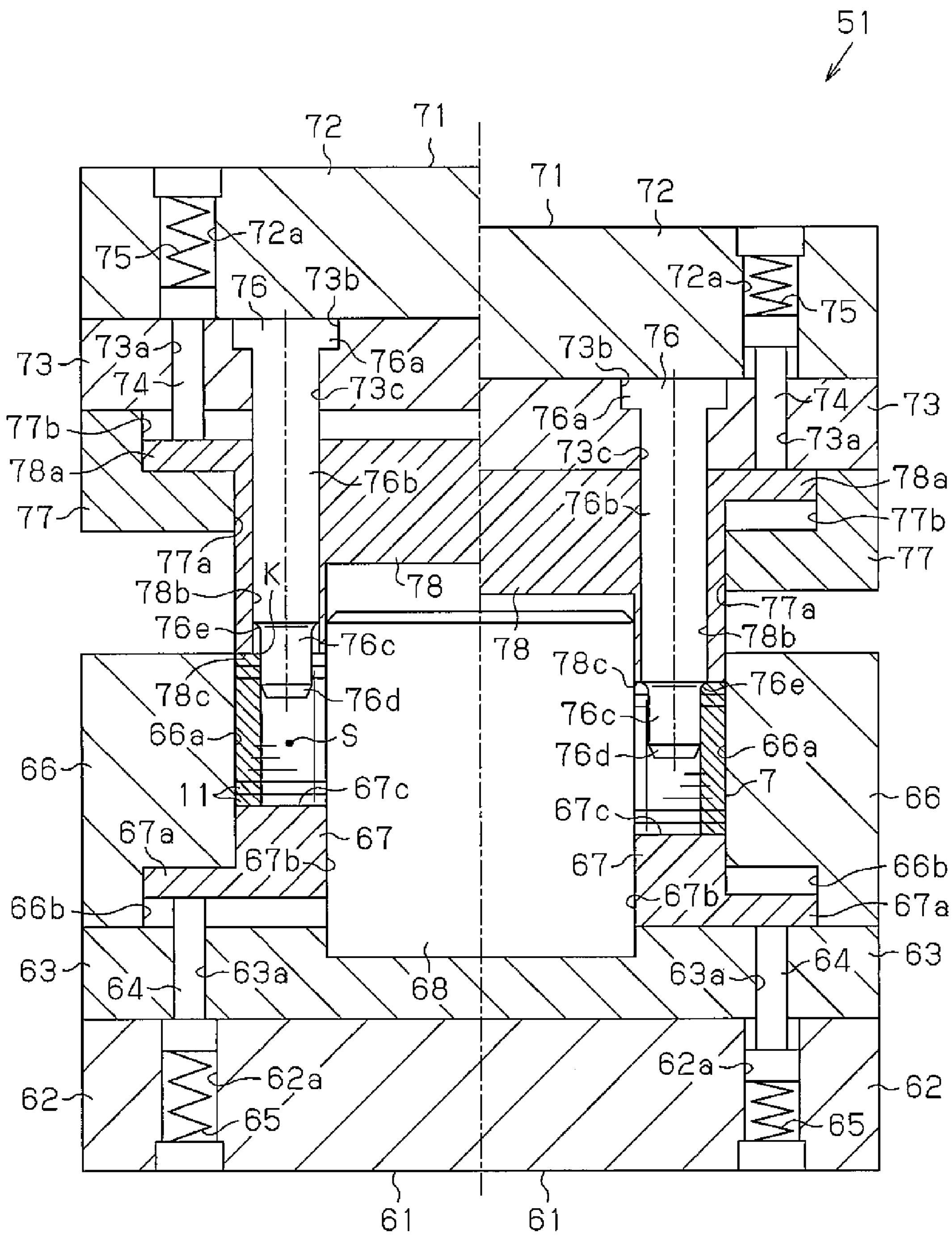
FIG. 10(*a*) is a schematic diagram of a pressing device in a state where it restrains the armature core.

A pressing device 51 used in the edge-removing step will be described with reference to FIGS. 10 to 14. As shown in FIGS. 10(*a*) and 10(*b*), the pressing device 51 includes a lower die 61 and an upper die 71 located above the lower die 61.

First, the lower die 61 will be described. A plate-like die plate 63 is placed on the upper surface of a plate-like lower die stage 62. A plurality of first insertion holes 63*a* are formed in the die plate 63 to vertically extend through the die plate 63, and first knockout pressing pins 64 are respectively inserted into the first insertion holes 63*a* such that the first knockout pressing pins 64 can move in the vertical direction relative to the die plate 63. In the lower die stage 62, first accommodation holes 62*a* are formed at positions that are adjacent to the first insertion holes 63*a* in the vertical direction, and the proximal ends (lower ends) of the first knockout pressing pins 64 are accommodated in the first accommodation holes 62*a*. The first springs 65, which upwardly urge the proximal ends of the first knockout pressing pins 64, are respectively accommodated in the first accommodation holes 62*a*.

An annular radially outer restraining ring 66 is placed on the upper surface of the die plate 63. The radially outer restraining ring 66 is located on the die plate 63 such that the radially outer restraining ring 66 cannot move relative to the die plate 63. The vertical length of the radially outer restraining ring 66 is longer than the axial length of the armature core 7. A restraining hole 66*a* having a circular cross section is formed at a radial central portion of the radially outer restraining ring 66, and the restraining hole 66*a* extends through the radially outer restraining ring 66 in the vertical direction. The inner diameter of the restraining hole 66*a* is substantially equal to the outer diameter of the armature core 7 and in the present embodiment, the inner diameter of the restraining hole 66*a* is slightly greater than the outer diameter of the armature core 7. The axial length, i.e., the vertical length of the restraining hole 66*a* is longer than the axial length of the armature core 7. A first stopper recess 66*b* is formed at the lower end of the radially outer restraining ring 66, and the first stopper recess 66*b* is upwardly recessed at the outer peripheral edge of the lower opening of the restraining hole 66*a*.

An annular lower knockout plate 67 is located inside of the radially outer restraining ring 66. A flange-like first stopper 67*a* extending radially outward is formed at the lower end of the lower knockout plate 67. The outer diameter of the first stopper 67*a* is substantially equal to the inner diameter of the first stopper recess 66*b*, and an axial thickness (vertical thickness) of the first stopper 67*a* is smaller than a depth (vertical depth) of the first stopper recess 66*b*. The first stopper 67*a* is located in the first stopper recess 66*b*, and the first stopper 67*a* can vertically move between the upper surface of the die plate 63 and the bottom surface of the first stopper recess 66*b*.

The outer diameter of the lower knockout plate 67 except for the first stopper 67*a*, i.e., the outer diameter of a portion of the lower knockout plate 67 located higher than the first stopper 67*a* is substantially equal to the inner diameter of the restraining hole 66*a*. The upper end of the lower knockout plate 67 is inserted into the restraining hole 66*a*. The axial length of a portion of the lower knockout plate 67 located higher than the first stopper 67*a* is shorter than the axial length of the restraining hole 66*a*. A through hole 67*b* is formed in a radial central portion of the lower knockout plate 67, and the through hole 67*b* extends through the lower knockout plate 67 in the axial direction. The inner diameter of the through hole 67*b* is substantially equal to the inner diameter of the armature core 7. The upper surface of the lower knockout plate 67 is a flat lower pressing surface 67*c*, and the lower pressing surface 67*c* intersects (horizontal) with an axial direction of the lower knockout plate 67 at right angles. The distal end surface of the first knockout pressing pin 64 abuts against the lower end surface of the lower knockout plate 67.

A columnar radially inner restraining metal core 68 located inside of the lower knockout plate 67. The radially inner restraining metal core 68 is arranged coaxially with the radially outer restraining ring 66 and the lower knockout plate 67. The lower end of the radially inner restraining metal core 68 is fixed to the die plate 63. The axial length of the radially inner restraining metal core 68 is longer than the axial length of the radially outer restraining ring 66, and both axial ends of the radially inner restraining metal core 68 project toward both axial sides of the radially outer restraining ring 66.

Figure 11:
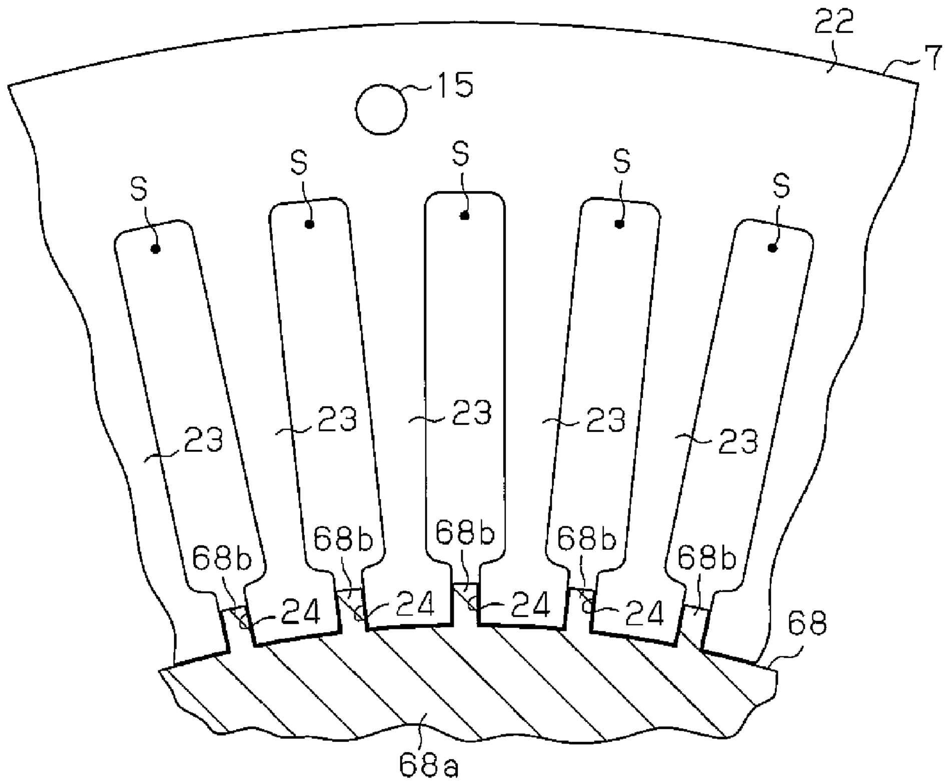
FIG. 11 is a cross-sectional view of an armature core restrained by a radially inner restraining metal core.

As shown in FIG. 11, the radially inner restraining metal core 68 includes a vertically extending columnar radially inner restraining portion 68*a*, and a plurality of (sixty in the present embodiment) distal end restraining portions 68*b* formed on the outer peripheral surface of the radially inner restraining portion 68*a*. The outer diameter of the radially inner restraining portion 68*a* is substantially equal to the inner diameter of the armature core 7 and is slightly smaller than the inner diameter of the armature core 7 in the present embodiment.

Each of the distal end restraining portions 68*b* projects radially outward from the outer peripheral surface of the radially inner restraining portion 68*a* and is formed into an elongated projection extending in the axial direction. The distal end restraining portions 68*b* are formed on the outer peripheral surface of the radially inner restraining portion 68*a* at equal angles (6° in the present embodiment) in the circumferential direction to correspond to the slits 24 formed in the armature core 7. The circumferential width of the distal end restraining portion 68*b* is substantially equal to (slightly narrower than) the circumferential width of the slit 24, and the circumferential length of the distal end restraining portion 68*b* is slightly shorter than the radial length of the slit 24.

Next, the upper die 71 will be described. As shown in FIGS. 10(*a*) and 10(*b*), the plate-like punch plate 73 is located under a plate-like upper die stage 72 such that the punch plate 73 abuts against the lower surface of the upper die stage 72. A plurality of second insertion holes 73*a* are formed in the punch plate 73 such that the second insertion holes 73*a* extend through the punch plate 73 in the vertical direction. Second knockout pressing pins 74 are respectively inserted into the second insertion holes 73*a* such that the second knockout pressing pins 74 can vertically move relative to the punch plate 73. A plurality of second accommodation holes 72*a* are formed in positions where the second accommodation holes 72*a* are adjacent to the second insertion holes 73*a* in the vertical direction on the upper die stage 72. The proximal ends (upper ends) of the second knockout pressing pins 74 are accommodated in the second accommodation holes 72*a*. Second springs 75, which downwardly urge the proximal ends of the second knockout pressing pins 74, are respectively accommodated in the second accommodation holes 72*a*.

The punch plate 73 holds a plurality of edge-removing punches 76 on an inner side of the second insertion holes 73*a*, and the number of the edge-removing punches 76 is the same as that of the slots S formed in the armature core 7 and is sixty. The edge-removing punches 76 are provided independently to correspond to the slots S, respectively. Each edge-removing punch 76 includes a plate-like base portion 76*a*, and a pressing portion 76*b* axially extending from the base portion 76*a*. The base portion 76*a* of the edge-removing punch 76 is accommodated in a holding recess 73*b* formed in the upper end of the punch plate 73 and held between the bottom surface of the holding recess 73*b* and the lower surface of the upper die stage 72. The pressing portions 76*b* of the edge-removing punches 76 are inserted into insertion holes 73*c*, which extend through the bottom of the holding recess 73*b*. The sixty edge-removing punches 76 held by the punch plate 73 are independently located at the same distances (at 6° intervals in circumferential direction in the present embodiment), from one another, as those of the slots S.

The pressing portions 76*b* substantially have a square pole shape axially extending from the lower end surface of the base portions 76*a*. As shown in FIGS. 10(*a*) and 12, each pressing portion 76*b* is provided at its distal end with an inserting portion 76*c*. The inserting portions 76*c* are also of a square pole shape that is thinner than a portion of the pressing portion 76*b* on the side of its proximal end. The cross-sectional shape of a portion of each pressing portion 76*b* located closer to the proximal end than the inserting portion 76*c* is a rectangle greater than the cross-sectional shape of each slot S. The outer shape of each inserting portion 76*c* is substantially the same as the inner peripheral surface shape of each slot S, and the cross-sectional shape that intersects the axial direction of the inserting portion 76*c* at right angles is substantially the same as the cross-sectional shape of the slot S. That is, the inserting portion 76*c* has an outer peripheral surface corresponding to the inner peripheral surface of the slot S. A truncated square pyramid-shaped introducing portion 76*d* is formed on the distal end of each inserting portion 76*c*. The introducing portion 76*d* becomes thinner toward the distal end of the inserting portion 76*c*. The pressing portions 76*b* of the sixty edge-removing punches 76 can be inserted into the sixty slots of the armature core 7 from the axial direction.

Figure 12:
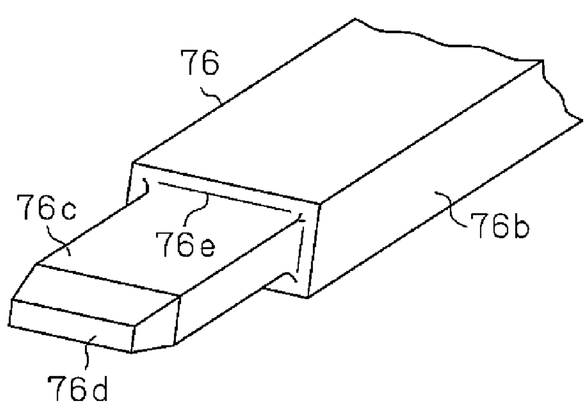
FIG. 12 is an enlarged partial perspective view of an edge-removing punch.
Figure 13A:
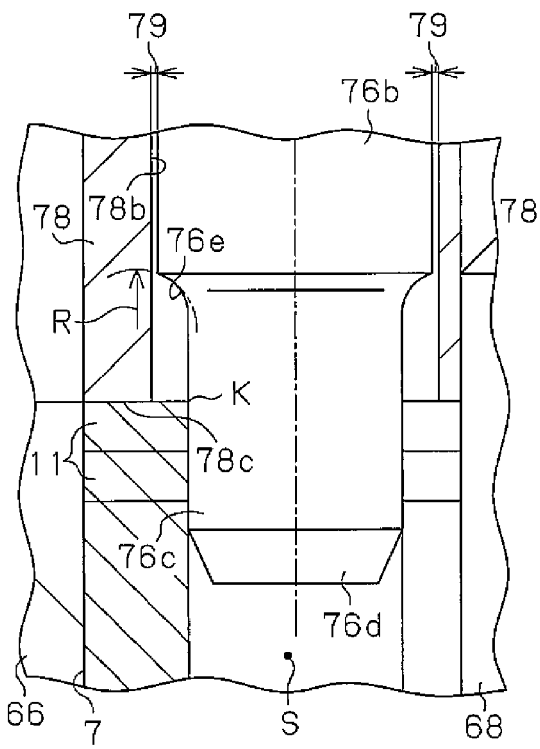
FIG. 13(*a*) is an enlarged partial view of the pressing device in a state where it restrains the armature core.
Figure 13B:
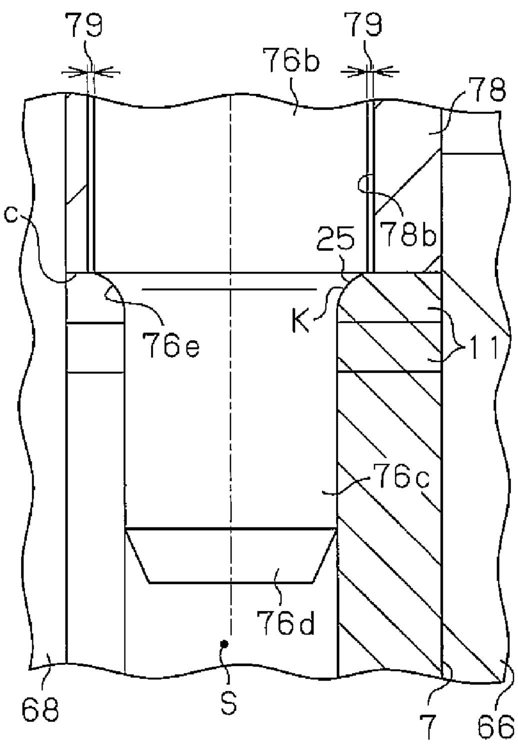

As shown in FIGS. 12 and 13A, an edge-removing surface 76*e* is formed on the proximal end of each inserting portion 76*c*. More specifically, the edge-removing surface 76*e* is formed in a region of the outer peripheral surface of the proximal end of each inserting portion 76*c* that corresponds to the axial opening peripheral edge of the corresponding slot S when the pressing portion 76*b* is inserted into the slot S. The edge-removing surfaces 76*e* are arcuately curved for removing the edges of the corner portions K in the slots S. In the present embodiment, a curvature radius R of the edge-removing surface 76*e* is set greater than the thickness of the core sheet 11. As shown in FIG. 13(*b*), the edge-removing surface 76*e* is formed such that when it is pressed by the corner portions K of the core sheets 11*a* and 11*b* located on both axial ends of the armature core 7, the edge-removing surface 76*e* does not come into contact with core sheets 11 that are adjacent to the core sheets 11*a* and 11*b*, i.e., second core sheets 11 from the both axial ends of the armature core 7.

As shown in FIG. 10(*a*), an annular knockout holder 77 is located below the punch plate 73. The knockout holder 77 abuts against the lower surface of the punch plate 73. The knockout holder 77 cannot move relative to the punch plate 73 and is arranged coaxially with the edge-removing punches 76. A guide hole 77*a* having a circular cross section is formed in a radial central portion of the knockout holder 77, and the guide hole 77*a* extends through the knockout holder 77 in the vertical direction. The inner diameter of the guide hole 77*a* is substantially equal to the outer diameter of the armature core 7 and in the present embodiment, the inner diameter is slightly greater than the outer diameter of the armature core 7. A second stopper recess 77*b* is formed in the upper end of the radially outer restraining ring 66. The second stopper recess 77*b* is recessed downward in an outer peripheral edge of the upper end opening of the guide hole 77*a*.

An annular upper knockout plate 78 is arranged inside of the knockout holder 77. The upper knockout plate 78 is arranged coaxially with the edge-removing punches 76. A radially outwardly extending flange-like second stopper 78*a* is formed at the upper end of the upper knockout plate 78. The outer diameter of the second stopper 78*a* is substantially equal to the inner diameter of the second stopper recess 77*b*.

An axial thickness (vertical thickness) of the second stopper 78*a* is smaller than a depth (vertical depth) of the second stopper recess 77*b*. The second stopper 78*a* is located in the second stopper recess 77*b* and can vertically move between the lower surface of the punch plate 73 and the bottom surface of the second stopper recess 77*b*.

The outer diameter of the upper knockout plate 78 except for the second stopper 78*a*, i.e., the outer diameter of a portion of the upper knockout plate 78 located lower than the second stopper 78*a* is substantially equal to the inner diameter of the guide hole 77*a*. A portion of the upper knockout plate 78 located lower than the second stopper 78*a* is inserted into the guide hole 77*a*, and this portion penetrates the guide hole 77*a* and projects downward further than the knockout holder 77.

Sixty punch insertion holes 78*b* into which the sixty pressing portions 76*b* of the edge-removing punches 76 are respectively inserted are formed in the upper knockout plate 78. The inner peripheral surface of each punch insertion hole 78*b* has a substantially square pole shape that corresponds to the outer shape of a portion of the corresponding pressing portion 76*b* closer to the proximal end than the inserting portion 76*c*. As shown in FIG. 13(*a*), slight gaps 79 are formed between the inner peripheral surface of each punch insertion hole 78*b* and the outer peripheral surface of the corresponding pressing portion 76*b*. Similarly, as shown in FIGS. 10(*a*) and 10(*b*), slight gaps are also formed between the outer peripheral surface of each base portion 76*a* and the inner peripheral surface of the corresponding holding recess 73*b* and between the outer peripheral surface of each pressing portion 76*b* and the inner peripheral surface of the corresponding insertion hole 73*c*. According to this configuration, the edge-removing punches 76 independently float with respect to the punch plate 73 and the upper knockout plate 78, and the edge-removing punches 76 can follow the position of the slot S.

Figure 14:
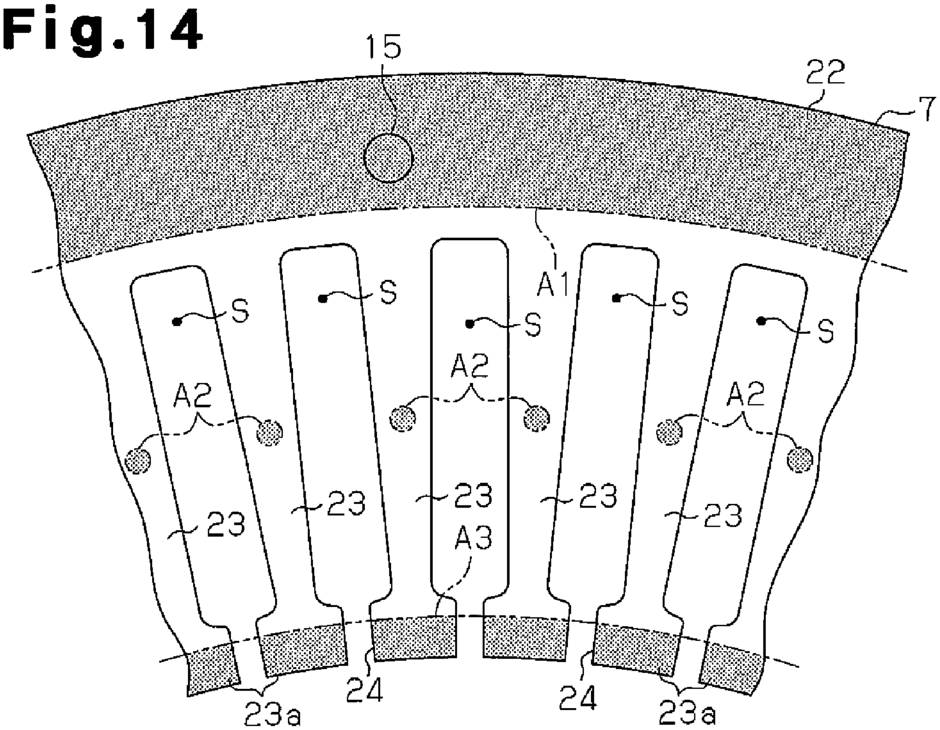
FIG. 14 is an explanatory diagram for explaining a region where the armature core is restrained from the axial direction in a pressing step.

As shown in FIG. 10(*a*), an upper pressing surface 78*c* is formed on the lower end surface of the upper knockout plate 78. The upper pressing surface 78*c* abuts, from above, an axial end surface of the armature core 7 located in the restraining hole 66*a* of the radially outer restraining ring 66. As shown in FIGS. 10(*a*) and 14, the upper pressing surface 78*c* is formed such that it can abut against an axial end surface of the annular portion 22, which is an annular first pressing region A1 including the fitting recess 16 and the fitting projection 15. The upper pressing surface 78*c* is formed such that it can abut against an axial end surface of each of the teeth 23, which is a second pressing region A2 set at a radial central portion of each of the teeth 23. The upper pressing surface 78*c* is formed such that it can abut against an axial end surface of each of the teeth 23, which is a third pressing region A3 existing at the distal end of each of the teeth 23. In FIG. 14, the first pressing region A1, the second pressing region A2 and the third pressing region A3 are shown by fine dots.

The upper die 71 is driven by a drive device (not shown).

In the pressing step using the pressing device 51, the lower die 61 and the upper die 71 are first separated from each other in the vertical direction. The lower knockout plate 67 is urged by the first spring 65 through the first knockout pressing pin 64, and the first stopper 67*a* abuts against the bottom surface of the first stopper recess 66*b*. The upper knockout plate 78 is urged by the second spring 75 through the second knockout pressing pin 74, and the second stopper 78*a* abuts against the bottom surface of the second stopper recess 77*b*. In this state, the armature core 7 formed in the laminating step is located in the restraining hole 66*a* of the radially outer restraining ring 66. The armature core 7 is inserted into the restraining hole 66*a* in the axial direction until the axial end surface of the armature core 7, which is opposed to the lower knockout plate 67, abuts against the lower pressing surface 67*c*. At this time, as shown in FIG. 11, the radially inner restraining metal core 68 is inserted into the armature core 7. That is, the radially inner restraining portion 68*a* is inserted into the distal end surfaces of the sixty teeth 23 from the axial direction and at the same time, the sixty distal end restraining portions 68*b* are inserted into the sixty slits 24 from the axial direction. The armature core 7 inserted into the restraining hole 66*a* is restrained by the radially outer restraining ring 66 from the radial outer side and is restrained by the radially inner restraining metal core 68 (radially inner restraining portion 68*a*) from the radial inner side. The distal ends of the teeth 23 are restrained by the distal end restraining portions 68*b* from circumferential both sides. The armature core 7 is restrained from radial outer and inner sides by the radially outer restraining ring 66 and the radially inner restraining metal core 68, and the armature core 7 is arranged coaxially with the edge-removing punches 76 and the upper knockout plate 78.

Thereafter, the upper die stage 72 is moved downward by the drive device (not shown) until the upper pressing surface 78*c* of the upper knockout plate 78 abuts against the armature core 7 from the axial direction. According to this operation, an axial end surface of the armature core 7 abuts against the upper pressing surface 78*c* of the upper knockout plate 78, and the other axial end surface of the armature core 7 abuts against the lower pressing surface 67*c* of the lower knockout plate 67. That is, as shown in FIG. 10(*a*), the armature core 7 is fixed from both axial sides by the upper knockout plate 78 and the lower knockout plate 67. At this time, by the downward movement of the edge-removing punch associated with the downward movement of the upper die stage 72, the introducing portions 76*d* of the sixty pressing portions 76*b* are respectively inserted into the sixty slots S from one axial end openings of the sixty slots S.

Thereafter, as shown in FIG. 10(*b*), the upper die stage 72 is further moved downward by the drive device. Then, the punch plate 73 and the edge-removing punches 76 are pressed by the upper die stage 72 and they are further moved downward, and the inserting portions 76*c* of the sixty pressing portions 76*b* are inserted into the slots S. According to this operation, the knockout holder 77 is pressed by the punch plate 73 and moved downward. At this time, each of the edge-removing punches 76 independently floats with respect to the punch plate 73 and the upper knockout plate 78. Hence, the edge-removing, punches 76 permit (absorb) dimension errors of the position of the slots S in the circumferential direction and the radial direction within a range of gaps between the punch plate 73 and the upper knockout plate 78, and the edge-removing punches 76 are located at positions corresponding to the positions of the slots S.

The second spring 75, which is compressed associated with the downward movement of the upper die stage 72, presses the second knockout pressing pin 74 downward, and the second knockout pressing pin 74 presses the upper knockout plate 78. Moreover, the upper knockout plate 78 presses the armature core 7 downward in the axial direction, the lower knockout plate 67 and the first knockout pressing pin 64 are moved downward by the pressing force, and therefore the first spring 65 is compressed. As a result, the armature core 7 is pressed from both sides in the axial direction and restrained by the lower knockout plate 67 and the upper knockout plate 78 by urging forces of the first spring 65 and the second spring 75.

Restraint of the armature core 7 caused by the lower knockout plate 67 and the upper knockout plate 78 will be described in detail. As shown in FIGS. 10(*b*) and 14, the upper pressing surface 78*c* abuts against the first pressing region A1. According to this abutment, the annular portion 22 of the armature core 7 is restrained from the axial direction by the lower knockout plate 67 and the upper knockout plate 78. The upper pressing surface 78*c* abuts against the second pressing region A2. According to this abutment, radial central portions of the teeth 23 of the armature core 7 are restrained from the axial direction by the lower knockout plate 67 and the upper knockout plate 78. Further, the upper pressing surface 78*c* abuts against the third pressing region A3. According to this abutment, the distal ends of the teeth 23 of the armature core 7 are restrained from the axial direction by the lower knockout plate 67 and the upper knockout plate 78. In the present embodiment, the magnitude of the restraining force per unit area of the lower knockout plate 67 and the upper knockout plate 78 to restrain the annular portion 22 from the axial direction is greater than the magnitude of the restraining force per unit area of the lower knockout plate 67 and the upper knockout plate 78 to restrain the distal ends of the teeth 23 from the axial direction. The magnitude of the restraining force, per unit area, of the lower knockout plate 67 and the upper knockout plate 78 to restrain the distal ends of the teeth 23 from the axial direction is greater than the magnitude of the restraining force per unit area of the lower knockout plate 67 and the upper knockout plate 78 to restrain the radial central portions of the teeth 23 from the axial direction. That is, among the restraining forces applied to the first to third pressing regions A1 to A3, the restraining force applied to the first pressing region A1 is the greatest, and the restraining force applied to the second pressing region A2 is the smallest.

As shown in FIGS. 10(*b*) and 13(*b*), in a state where the armature core 7 is restrained from both sides in the axial direction by the lower knockout plate 67 and the upper knockout plate 78, the edge-removing punches 76 are further moved downward associated with the downward movement of the upper die stage 72. Then, the edge-removing surfaces 76*e* of the edge-removing punches 76 are pressed against the corner portions K of the core sheet 11*a* located at one axial end (upper end in FIG. 10(*b*)) of the armature core 7. According to this configuration, the arcuate edge-removed portions 25 are formed on the corner portions K of the core sheet 11*a*. At this time, the edge-removing surface 76*e* comes into contact only with the core sheet 11*a* located at one axial end of the armature core 7 and does not come into contact with another core sheet 11 that is adjacent to the former core sheet 11*a* (i.e., second core sheet 11 from one axial end of armature core 7).

Thereafter, the upper die stage 72 is moved upward by the drive device. As the upper die stage 72 is moved upward, the punch plate 73 and the edge-removing punches 76 are also moved upward. At this time, the lower knockout plate 67 and the upper knockout plate 78 are pressed toward the armature core 7 by the urging forces of the first spring 65 and the second spring 75. Hence, the armature core 7 is maintained in a state where it is restrained from both axial sides by the lower knockout plate 67 and the upper knockout plate 78. That is, according to the armature core 7, the annular portion 22, the radial central portions of the teeth 23 and the distal ends of the teeth 23 are maintained in a state where they are restrained from the both axial sides by the lower knockout plate 67 and the upper knockout plate 78. In this state, the edge-removing punches 76 are moved upward, the corner portions K, on which the edge-removed portions 25 are formed, are separated from the edge-removing surfaces 76*e*. After the state shown in FIG. 10(*a*) is established, the upper die 71 is further moved upward, and the armature core 7 can be taken out from the restraining hole 66*a*. Thereafter, the edge-removed portions 25 are formed also on the corner portions K of the core sheet 11*b* located on the other axial end side of the armature core 7, located on an end of the armature core 7 opposite from the end on which the edge-removed portions 25 are first formed.

Figure 15:
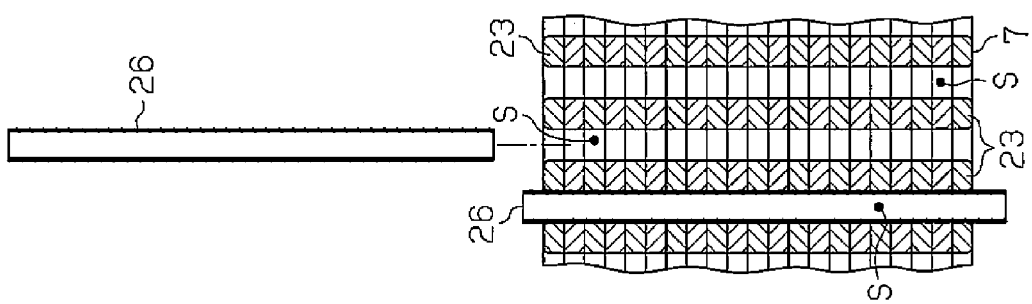
FIG. 15 is a diagram for explaining an insulating member inserting step.

Next, as shown in FIG. 15, an insulating member inserting step for inserting the insulating member 26 into each slot S is carried out. The insulating member 26 is formed by folding back a square sheet-like insulating material (not shown) such that both ends of the insulating material are opposed to each other. The insulating member 26 has a substantially U-shaped cross section. In the insulating member inserting step, the insulating member 26 is bent and the insulating member 26 is inserted into the slot S in the axial direction of the armature core 7 from one axial end opening of the slot S. The insulating member 26 is inserted into the slot S until the insulating member 26 projects from both axial side openings of the slot S.

Figure 16:
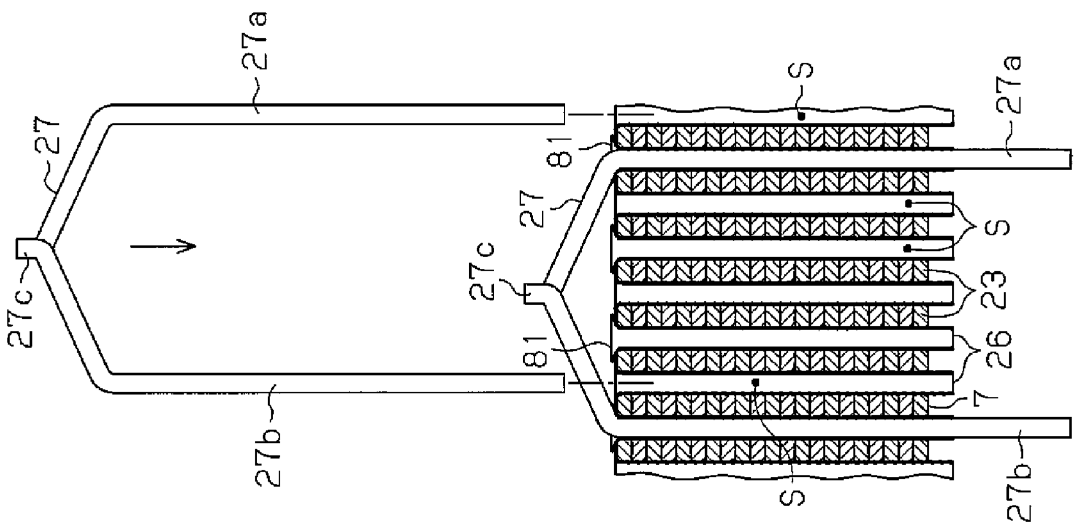
FIG. 16 is a diagram for explaining a conductor inserting step.

Next, a spreading step for circumferentially spreading one axial end of the insulating member 26 projecting in the axial direction from each slot S is carried out. In the spreading step, a heating forming device (not shown), which is heated to a predetermined temperature is brought into contact, under pressure, with one ends of the insulating members 26, which project from one end openings of the slots S. The heating forming device can be moved in the axial direction of the armature core by the drive device (not shown). According to this operation, the one ends of the insulating members 26 are spread in the circumferential direction by the heating forming device. That is, as shown in FIG. 16, spread portions 81, which spread in the circumferential direction, are formed on one ends of the insulating members 26.

Next, a conductor inserting step for inserting, from the axial direction, the segment conductors 27 to interiors of the insulating members 26 inserted into the slots S is carried out. In the conductor inserting step, the two straight portions 27*a* and 27*b* of each substantially U-shaped segment conductor 27 are respectively inserted into two slots S that are separated from each other in the circumferential direction by the distance corresponding to a predetermined number of slots S. The straight portions 27*a* and 27*b* are inserted inside the insulating members 26 from the spread portions 81. The segment conductors 27 are moved relative to the armature core 7 in the axial direction of the armature core 7 until distal ends of the straight portions 27*a* and 27*b* project outside of the slots S from the other axial end openings of the slots S, i.e., from openings on a side opposite from the spread portion 81.

Figure 17:
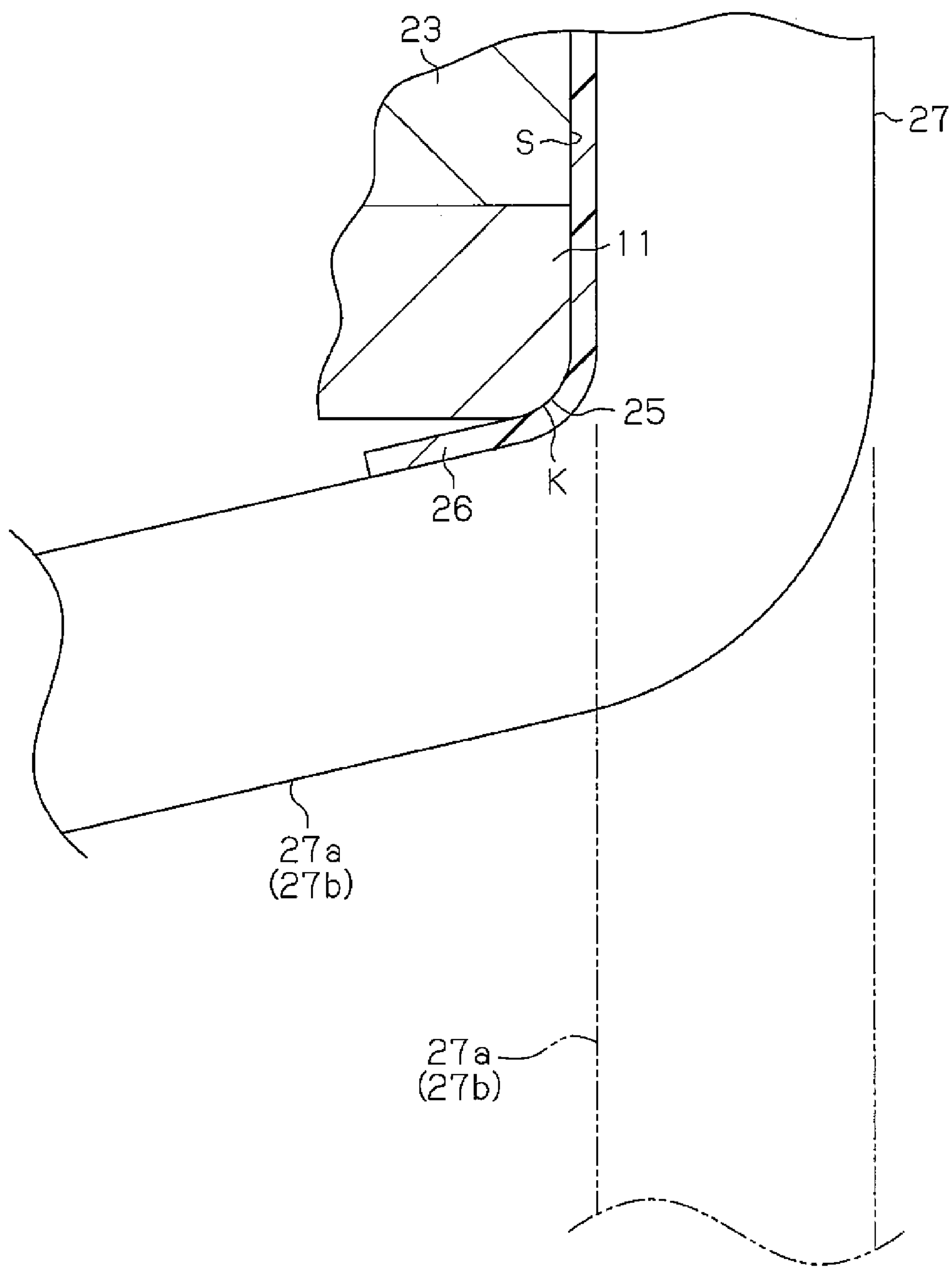
FIG. 17 is an enlarged partial cross-sectional view of the stator for explaining a bending step.

Next, a bending step for circumferentially bending the distal ends of the straight portions 27*a* and 27*b*, which project from the other axial end opening of each slot S, is carried out. As shown in FIG. 17, in the bending step, the straight portions 27*a* and 27*b* are pressed against the edge-removed portions 25 and circumferentially bent in the vicinity of the edge-removed portions 25 in a state where the insulating member 26 is located between the straight portions 27*a* and 27*b* and the edge-removed portions 25 provided in the other axial end opening edge of the slot S. The distal ends of the straight portions 27*a* and 27*b* are bent in the circumferential direction. According to this bending operation, the distal ends of the straight portions 27*a* and 27*b* are located at positions that are adjacent to other straight portions 27*a* and 27*b*, which are to be connected respectively.

Next, a connecting step for electrically connecting the straight portions 27*a* and 27*b* is carried out. In the connecting step, the straight portions 27*a* and 27*b* are electrically connected to other straight portions 27*a* and 27*b* by welding. According to this step, the segment conductors 27 are formed from the segment conductors 27 and the stator 6 is completed.

Next, operation of the manufacturing method of the stator 6 of the present embodiment will be described.

In the pressing device 51 used in the edge-removing step, each of the edge-removing punches 76 is in the independently floating state with respect to the punch plate 73 and the upper knockout plate 78. Hence, each of the edge-removing punches 76 can follow the position of the slot S. As a result, it is possible to reliably chamfer while suppressing deformation (distortion) of the teeth 23.

In the edge-removing step, the corner portions K in the two core sheets 11*a* and 11*b* on both axial ends of the armature core 7 are pressed and chamfered, and the arcuate edge-removed portions 25 are formed on the corner portions K. Hence, in the bending step, the contact area between the insulating member 26 and the corner portions K when the straight portions 27*a* and 27*b* are circumferentially bent while pressing the straight portions 27*a* and 27*b* against the corner portions K becomes greater than the contact area when the corner portions K do not have the edge-removed portions 25 and the corner portions K are pointed. Therefore, when the straight portions 27*a* and 27*b* are bent, it is possible to prevent a great force from being locally applied to the insulating member 26 which is located between the corner portions K and the straight portions 27*a* and 27*b*. As a result, the insulating member 26 is prevented from being damaged by the axial opening edge of the slot S.

The present embodiment provides the following advantages.

(1) In the edge-removing step, corner portions K of the axial opening edges of the slots S in the two core sheets 11 located on both axial ends of the armature core 7 are pressed and chamfered. According to this edge-removing step, the edge-removed portions 25 are formed on the corner portions K. Hence, when the segment conductors 27 inserted into the slots S are circumferentially bent in the bending step, even if the segment conductors 27 are pushed against the axial opening edge of the slots S, the insulating members 26 located between the segment conductors 27 and the axial opening edge of the slots S are prevented from being damaged by the axial opening edges of the slots S. Therefore, it is possible to ensure the insulation properties between the segment conductors 27 and the armature core 7. Since it is possible to prevent the insulating member 26 from being damaged only by pressing the corner portions K of the opening edges of the slots S by the edge-removing punches 76 in this manner, a new part that is different from the armature core 7, the segment conductors 27 and the insulating members 26 does not need to be added. Therefore, it is unnecessary to change the shape of an existing part such as the armature core 7 to provide the stator 6 with a new part, and it is unnecessary to provide equipment for manufacturing the new part. That is, it is possible to prevent the insulating members 26 from being damaged when the segment conductors 27 are bent by adding a slight manufacturing cost for adding a step for pressing the corner portions K and removing the edges of the corner portions K of the opening edges of the slots S in the existing core sheet 11. Even if the corner portions K of the slots S are pressed and chamfered, the cross-sectional area of the opening of each slot S is not easily reduced. From this reason, it is possible to ensure the insulation properties between the segment conductors 27 and the armature core 7 while preventing the manufacturing cost from increasing and preventing the space factor from lowering.

(2) By inserting the inserting portions 76*c* into the slots S, it becomes easy to arrange the edge-removing punches 76 at positions corresponding to the positions of the slots S, into which the inserting portions 76*c* are inserted. Therefore, the edge-removing punches 76 can easily absorb dimension errors of the slots S. The teeth 23 on both circumferential sides of each slot S are substantially restrained in the circumferential direction by the inserting portions 76*c* inserted into the slots S. Therefore, it is possible to prevent the teeth 23 from being deformed in the circumferential direction when the corner portions K of the slots S in the core sheet 11 located at an axial end of the armature core 7 are pressed by the edge-removing punches 76.

(3) The number of edge-removing punches 76 is the same as that of the slots S, i.e., sixty, and the edge-removing punches 76 independently correspond to respective slots S. Therefore, dimension errors (positional deviations of slots S in armature core 7) of all of the slots S can be permitted by the edge-removing punches 76, which correspond to the respective slots S. Hence, it is possible to more effectively suppress the deformation of the teeth 23 located on the both sides of the slots S in the circumferential direction and to chamfer the corner portions K of the opening edges of the slots S in the core sheet 11 located at the axial end of the armature core 7.

(4) Only the two core sheets 11 located on the both axial ends of the armature core 7 are chamfered. Therefore, deformation of the teeth 23 caused by the edge-removing operation can be suppressed to a small degree. As a result, a cogging torque caused by deformation of the distal ends of the teeth 23 can be prevented from increasing.

(5) In the pressing step, the corner portions K of the slots S in the core sheet 11 located at the axial end of the armature core 7 are pressed by the edge-removing punches 76 in a state where the armature core 7 is restrained from the radial inner and outer sides of the armature core 7. Therefore, when the corner portions K of the slots S are pressed by the edge-removing punches 76, it is possible to prevent the armature core 7 from deforming in the radial direction.

(6) In the pressing step, the corner portions K of the opening edges of the slots S in the core sheet 11 located at the axial end of the armature core 7 is pressed by the edge-removing punches 76 in a state where the distal ends of the teeth 23 and the annular portion 22 are restrained from the axial direction. Therefore, when the corner portions K are pressed by the edge-removing punches 76, it is possible to prevent the annular portion 22 and the teeth 23 from deforming in the axial direction.

(7) Axially adjacent yoke forming portions 12 are fixed to each other through the fitting projections 15 and the fitting recesses 16 provided on the yoke forming portions 12. Hence, non-uniform stresses are generated on portions of the yoke forming portion 12 where the fitting projections 15 and the fitting recesses 16 are provided, as compared with other portions of the yoke forming portion 12 where the fitting projections 15 and the fitting recesses 16 are not provided. Therefore, in the pressing step, if the corner portions K of the slots S in the core sheet 11 located at the axial end of the armature core 7 are pressed by the edge-removing punches 76 without restraining, from the axial direction, the portions of the annular portion 22 where the fitting projections 15 and the fitting recesses 16 are provided, deforming forces that deform the core sheet 11 into various direction are prone to be generated. Various deforming forces may be also applied to the corner portions K and the corner portions K may not be excellently chamfered. Hence, as in the present embodiment, a range of the annular portion 22 including the fitting projections 15 and the fitting recesses 16, i.e., the first pressing region A1 in the axial end surface of the armature core 7 is restrained from the axial direction. According to this configuration, when the corner portions K are pressed by the edge-removing punches 76, it is possible to prevent various deforming forces from being applied to the corner portions K. Therefore, it is possible to excellently chamfer the corner portions K of the slots S in the core sheet 11 located at the axial end of the armature core 7. If the region of the annular portion 22 including the fitting projections 15 and the fitting recesses 16 is restrained from the axial direction, the axially adjacent yoke forming portions 12 can be maintained in a state where they are fixed to each other through the fitting projections 15 and the fitting recesses 16 even when the edge-removing punches 76 are pressed against the corner portions K of the core sheet 11 located at the axial end of the armature core 7.

(8) In the pressing step, the corner portions K of the opening edges of the slots S in the core sheet 11 located at the axial end of the armature core 7 are pressed by the edge-removing punches 76 in a state where the distal end restraining portions 68*b*, which restrain the distal ends of the teeth 23 from the circumferential direction, are inserted into the slits 24, respectively. Therefore, when the corner portions K is pressed by the edge-removing punches 76, it is possible to prevent the distal ends of the teeth 23 from deforming in the circumferential direction.

(9) When the pressing step is carried out, the magnitude of a restraining force per unit area of the lower knockout plate 67 and the upper knockout plate 78 to restrain the annular portion 22 from the axial direction is greater than the magnitude of a restraining force per unit area of the lower knockout plate 67 and the upper knockout plate 78 to restrain the distal ends of the teeth 23 from the axial direction. Therefore, by restraining the distal ends of the easily deformable teeth 23 from the axial direction with a smaller restraining force than that of the annular portion 22, it is possible to chamfer, in a well-balanced manner, the entire corner portions K of the slots S in the core sheet 11 located at the axial end of the armature core 7.

(10) In the pressing step, the corner portions K are pressed by the edge-removing punches 76 and the armature core 7 are separated from the edge-removing punches 76 in a state where the radial central portions of the teeth 23 are restrained from the axial direction. Therefore, it is possible to chamfer the corner portions K of the slots S in the core sheet 11 located at the axial end of the armature core 7 in a state where the positions of the teeth 23 are stable. Hence, the corner portions K can be chamfered more excellently. Further, since the armature core 7 is separated from the edge-removing punches 76 in the sate where the radial central portions of the teeth 23 are restrained from the axial direction, the armature core 7 and the edge-removing punches 76 are easily separated from each other. Therefore, it is possible to prevent the armature core 7 from biting into the edge-removing punches 76.

(11) Since the coils (i.e., segment coils 28) are formed from the segment conductors 27, the space factor can be increased.

(12) The core sheets 11 that are located at the axial ends of the armature core 7 and whose corner portions K are chamfered, i.e., the core sheets 11*a* and 11*b*, are made of magnetic material that is softer than silicon steel sheet. Therefore, it is easy to chamfer the core sheets 11*a* and 11*b*. Of the core sheets 11 constituting the armature core 7, core sheets 11 other than the core sheets 11*a* and 11*b* are formed from silicon steel sheet through which a magnetic field easily passes. Hence, in the motor 1 having the stator 6, it is possible to ensure magnetic performance (magnetic permeability) of about the same level as that of the conventional technique.

(13) Each of the yoke forming portions 12 has fitting projections 15 and fitting recesses 16, which fix the axially adjacent yoke forming portions 12 to positions on the extension lines L2 of the center lines L1 of the tooth forming portions 13. The fitting projections 15 and the fitting recesses 16 are formed at positions separated, by equal distances, from the slots S on both sides in the circumferential direction of the corresponding teeth 23. Therefore, when the corner portions K are chamfered with respect to the core sheet 11 of the axial end of the armature core 7, it becomes easy to equalize the deformation amounts of the core sheets 11 generated on the circumferentially both sides of the tooth forming portions 13 corresponding to the fitting projections 15 and the fitting recesses 16. Hence, it is possible to prevent the core sheet 11 of the axial end of the armature core 7 from deforming into a distorted shape. Further, it is possible to prevent the fitting projection 15 and the fitting recess 16 from becoming a magnetic resistance against a magnetic flux flowing through the annular portion 22.

(14) The corner portions K of the slots S in the core sheet 11 located at the axial end of the armature core 7 are chamfered. Therefore, also when the coils (i.e., segment coils 28) are formed from the segment conductors 27 as in the present embodiment, it is possible to prevent the insulating members 26 located between the armature core 7 and the straight portions 27*a* and 27*b* from being damaged when the distal ends of the straight portions 27*a* and 27*b* (ends of the straight portions 27*a* and 27*b* opposite from the connecting portions 27*c*) are bent in the circumferential direction.

(15) Since the motor 1 includes the consequent-pole type rotor 31, the number of the magnets 45 mounted on the rotor 31 can be reduced in half. Therefore, the manufacturing cost of the motor 1 can be reduced. Since the rotor 31 includes the gaps 46, it is possible to reduce the rotor 31 in weight and to reduce the entire motor 1 in weight.

(16) Since the edge-removed portions 25 are formed on the corner portions K of the opening edges of the slots S, it is possible to prevent the insulating members 26 from being damaged by the corner portions K when the insulating members 26 are inserted into the slots S in the insulating member inserting step. Therefore, it is possible to ensure the insulation properties between the armature core 7 and the segment conductors 27 while the insulating members 26 are thinned. As a result, it is possible to further prevent the manufacturing cost from increasing, to further prevent the space factor from lowering and to ensure the insulation properties between the segment conductors 27 and the armature core 7.

(17) The slight gaps 79 are formed between the inner peripheral surface of each punch insertion hole 78*b* and the outer peripheral surface of the corresponding pressing portion 76*b*. Therefore, the edge-removing punches 76 can easily move relative to the upper knockout plate 78. As a result, the inserting portions 76*c* of the edge-removing punches 76 can be easily inserted into the slots S.

(18) The truncated square pyramid-shaped introducing portions 76*d*, which become thinner toward the distal ends of the inserting portions 76*c*, are formed on the distal ends of the inserting portions 76*c*. Therefore, it is possible to prevent the distal ends of the inserting portions 76*c* from coming into contact with the corner portions K by inserting the inserting portions 76*c* into the slots S from the introducing portions 76*d*.

The embodiment of the invention may be modified as follows.

Although the rotor 31 includes the gaps 46 in the above described embodiment, the rotor 31 does not necessarily need to include the gaps 46. The rotor 31 is not limited to the consequent-pole type rotor. For example, magnets of a north pole and magnets of a south pole may be arranged alternately in the circumferential direction. The rotor 31 may be of a magnet-embedded type rotor in which a magnet is embedded in the rotor core for every magnetic pole. The number of the magnets 45 of the rotor 31 is not limited to five and the number may appropriately be changed.

In the above described embodiment, the two core sheets 11*a* and 11*b*, which are located at both axial ends of the armature core 7 and on which the edge-removed portions 25 are formed, are made of magnetic material that is softer than silicon steel sheet. The core sheets 11 other than the core sheets 11*a* and 11*b* are made of silicon steel sheet. Alternatively, each of the core sheets 11 located at both axial ends may be made of magnetic material that is softer than silicon steel sheet, and remaining core sheets 11 may be made of silicon steel sheet. According to this configuration also, the same advantage as that of (12) of the above described embodiment can be obtained. All of the core sheets 11 constituting the armature core 7 may be made of magnetic material that is softer than silicon steel sheet or may be made of silicon steel sheet. The core sheet 11 may be made of magnetic material that is softer than silicon steel sheet, or may be made of steel sheet other than silicon steel sheet.

In the above described embodiment, the conductors that are inserted into the slots S are the substantially U-shaped segment conductors 27, which constitute the segment coils 28. However, the conductors that are inserted into the slots S are not limited to the segment conductors 27 and the conductors may be made of copper wires.

In the above described embodiment, the twelve fitting projections 15 are formed on the extension lines L2 of the center lines L1 of the twelve tooth forming portions 13 arranged at 30° intervals in the circumferential direction on the yoke forming portion 12 of each of the core sheets 11. Further, the twelve fitting recesses 16 are formed on the surface of the yoke forming portion 12 opposite from the fitting projections 15. However, the number of the fitting projections 15 and the number of the fitting recesses 16 are not limited to them. For example, the fitting projections 15 and the fitting recesses 16, which respectively correspond to the fitting projections 15, may be formed on the yoke forming portion 12 at six positions at 60° intervals in the circumferential direction or at four positions at 90° intervals in the circumferential direction while taking the magnetic characteristics of the motor 1 into account. In this case also, the fitting projections 15 are formed on the extension lines L2 of the center lines L1 of the tooth forming portions 13, and the fitting recesses 16 are formed on the surface of the yoke forming portion 12 opposite from the fitting projections 15. The fitting projections 15 and the fitting recesses 16 may be formed on the yoke forming portion 12 at positions deviated from the extension lines L2 in the circumferential direction.

In the pressing step for the above described embodiment, the corner portions K are pressed by the edge-removing punches 76 and the armature core 7 is separated from the edge-removing punches 76 in the state where the radial central portions of the teeth 23 are restrained from the axial direction. However, it is not absolutely necessary to press the corner portions K by the edge-removing punches 76 and to separate the armature core 7 from the edge-removing punches 76 in the state where the radial central portions of the teeth 23 are restrained from the axial direction.

In the pressing step of the above described embodiment, the edge-removing punches 76 press the corner portions K of portion that become opening edges of the axial opening of the slots S in the core sheet 11 located at the axial end of the armature core 7 in the state where the annular portion 22 and the distal ends of the teeth 23 are restrained from the axial direction. At this time, the magnitude of the restraining force per unit area of the lower knockout plate 67 and the upper knockout plate 78 to restrain the annular portion 22 from the axial direction is greater than the magnitude of the restraining force per unit area of the lower knockout plate 67 and the upper knockout plate 78 to restrain the distal ends of the teeth 23 from the axial direction. However, the magnitude of the restraining force generated in the annular portion 22 and the magnitude of the restraining force generated in the distal ends of the teeth 23 are not limited to them. For example, the magnitude of the restraining force generated in the annular portion 22 per unit area may be set to the same value as the magnitude of the restraining force generated in the distal ends of the teeth 23 per unit area. Further, in the pressing step, it is not absolutely necessary to restrain the annular portion 22 and the distal ends of the teeth 23 from the axial direction.

In the pressing step of the above described embodiment, the edge-removing punches 76 press the corner portions K of the opening edges of the slots S in the core sheet 11 located at the axial end of the armature core 7 in the state where the distal end restraining portions 68*b*, which restrain the distal ends of the teeth 23 from the circumferential direction, are inserted into the slits 24. However, it is not absolutely necessary to insert the distal end restraining portions 68*b* into the slits 24. In this case, the radially inner restraining metal core 68 includes the radially inner restraining portion 68*a* only.

In the pressing step of the above described embodiment, a region of the annular portion 22 including the fitting projections 15 and the fitting recesses 16 is restrained from the axial direction. However, a region of the annular portion 22 that does not include the fitting projections 15 and the fitting recesses 16 may be restrained from the axial direction.

In the pressing step of the above described embodiment, the edge-removing punches 76 press the corner portions K of the opening edges of the slots S in the core sheet 11 located at the axial end of the armature core 7 in the state where the armature core 7 is restrained from the radial inner and outer sides of the armature core 7. Alternatively, the armature core 7 may be restrained only from the radial inner side by the radially inner restraining metal core 68. The armature core 7 may be restrained only from the radial outer side by the radially outer restraining ring 66. It is not absolutely necessary to restrain the armature core 7 from the radial inner and outer sides of the armature core 7.

In the above described embodiment, the edge-removed portions 25 are formed on the two core sheets 11 of both axial ends of the armature core 7. Alternatively, the edge-removed portions 25 may be formed on only any one of the core sheets 11 of one axial side of the armature core 7, i.e., one of the core sheets 11*a* and 11*b*.

In the above described embodiment, the edge-removed portions 25 are arcuate. However, the shape of the edge-removed portions 25 is not limited to the arcuate shape (rounded shape), and it may be of a chamfered shape. In this case, the tapered shape is inclined at 45° to 80° with respect to the axial direction of the armature core 7 for example. According to this configuration also, the same advantage as that of the above described embodiment can be obtained.

The edge-removing step may be carried out any time after the laminating step and before the insulating member inserting step.

It is not absolutely necessary to carry out the spreading step.

In the above described embodiment, the number of the edge-removing punches 76 is sixty which is the same as the number of the slots S, and the edge-removing punches 76 respectively correspond to the slots S. Alternatively, the edge-removing punches 76 may be independent corresponding to the slots S. For example, the edge-removed portions 25 may be formed on the core sheet 11 located at the axial end of the armature core 7 using independent twenty edge-removing punches 76 each corresponding to three slots S arranged in the circumferential direction. According to this configuration also, the same advantage as that of (1) of the above described embodiment can be obtained.

In the above described embodiment, the armature core 7 includes the sixty teeth 23 and according to this configuration, the armature core 7 includes sixty slots S in the circumferential direction. However, the number of the teeth 23 (number of slots S) may appropriately be changed.

The invention claimed is:

1. A method for manufacturing an armature core, the method including the steps of:

laminating a plurality of core sheets in an axial direction to form an armature core, each of the core sheets including an annular yoke forming portion and a plurality of tooth forming portions which inwardly extend in a radial direction of the armature core from the yoke forming portion, the armature core including an annular portion having the laminated yoke forming portions, a plurality of teeth including the laminated tooth forming portions and inwardly extending in the radial direction from the annular portion;

circumferentially aligning the core sheets to form a plurality of slots formed between circumferentially adjacent pairs of teeth;

providing a plurality of axially-extending, independently-floating, edge-removing punches having edge-removing surfaces, each of the independently floating punches supported in a manner allowing movement in a circumferential direction relative to one another, thereby facilitating alignment of each punch with a corresponding slot of the armature core;

inserting ends of the punches into the slots such that each of the edge-removing surfaces contacts an edge of a corner portion of an endmost core sheet at an axial end of the armature core;

after laminating the core sheets and inserting ends of the punches into the slots, pressing each of the edge-removing surfaces against each of the edges, thereby chamfering each of the edges;

inserting insulating members into the slots, causing inner peripheral surfaces of the core sheets forming the slots, including the chamfered edges, to be covered;

inserting into the slots a plurality of conductors, the plurality of conductors constituting a coil, such that the insulating members are between the inner peripheral surfaces of the core sheets and the conductors;

bending the plurality of conductors in circumferential directions at positions near axial openings of the slots defined the chamfered edges.

2. The method for manufacturing an armature core according to claim 1, further including-restraining the armature core from a radial inner side and outer side of the armature core, when pressing each of the edge-removing surfaces against each of the edges.

3. The method for manufacturing an armature core according to claim 1, further including restraining from the axial direction distal ends of the teeth and the annular portion, when pressing each of the edge-removing surfaces against each of the edges.

4. The method for manufacturing an armature core according to claim 3, wherein:

each of the yoke forming portions includes a fixing portion for fixing, to each other, the yoke forming portions that are adjacent to each other in the axial direction, and the method further includes restraining from the axial direction, a region of the annular portion that includes the fixing portion, when pressing each of the edge-removing surfaces against each of the edges.

5. The method for manufacturing an armature core according to claim 1, wherein:

each of the teeth includes a rotor facing portion projecting in the circumferential direction in a distal end of the tooth, a slit, which opens inside of the slot and radially inward of the armature core of the stator, is formed between distal end surfaces of each circumferentially adjacent pair of the rotor facing portions, and the method further includes inserting distal end restraining portions into each of the slits, the distal end restraining portions restraining distal ends of the teeth from the circumferential direction, when pressing each of the edge-removing surfaces against each of the edges.

6. The method for manufacturing an armature core according to claim 5, further including restraining from the axial direction the annular portion and the distal ends of the teeth, when pressing each of the edge-removing surfaces against each of the edges, and wherein a magnitude of a restraining force per unit area to restrain the annular portion from the axial direction is greater than a magnitude of a restraining force per unit area to restrain the distal ends of the teeth from the axial direction.

7. The method for manufacturing an armature core according to claim 1, further including restraining from the axial direction radial central portions of the teeth, when pressing each of the edge-removing surfaces against each of the edges, and restraining from the axial direction radial central portions of the teeth, when separating the armature core from the edge-removing punches.

8. The method for manufacturing an armature core according to claim 1, further including-a conductor inserting step for inserting the conductor into the sheet insulating member from the axial direction, wherein the conductor includes two straight portions and a connecting portion, which connects the straight portions to each other, and the conductor is a substantially U-shaped segment conductor.

9. The method for manufacturing an armature core according to claim 1, wherein a first core sheet group including at least one or some of the core sheets whose corner portion is chamfered is made of magnetic material that is softer than silicon steel sheet, and the core sheets other than the first core sheet group are made of silicon steel sheet.

* * * * *